United States Patent
Smith et al.

(10) Patent No.: US 8,296,943 B2
(45) Date of Patent: Oct. 30, 2012

(54) METHOD FOR MAKING SURVEILLANCE DEVICES WITH MULTIPLE CAPACITORS

(75) Inventors: Patrick Smith, San Jose, CA (US); Criswell Choi, Menlo Park, CA (US); James Montague Cleeves, Redwood City, CA (US); Vivek Subramanian, Orinda, CA (US); Arvind Kamath, Mountain View, CA (US); Steven Molesa, Sunnyvale, CA (US)

(73) Assignee: Kovio, Inc., San Jose, CA (US)

( * ) Notice: Subject to any disclaimer, the term of this patent is extended or adjusted under 35 U.S.C. 154(b) by 564 days.

(21) Appl. No.: 12/467,121

(22) Filed: May 15, 2009

(65) Prior Publication Data

US 2010/0123582 A1 May 20, 2010

Related U.S. Application Data

(60) Provisional application No. 61/127,899, filed on May 15, 2008, provisional application No. 61/056,804, filed on May 28, 2008.

(51) Int. Cl.
*H05K 3/02* (2006.01)
*H05K 3/10* (2006.01)

(52) U.S. Cl. ........... 29/846; 29/25.02; 29/831; 361/765; 438/190; 438/240

(58) Field of Classification Search ............... 29/25.01, 29/25.02, 600, 601.1, 830, 831, 846, 847, 29/851; 174/257; 361/751, 765, 766, 795, 361/811; 428/210; 438/149, 190, 240
See application file for complete search history.

(56) References Cited

U.S. PATENT DOCUMENTS

| 6,093,575 A * | 7/2000 | Eguchi .................... 438/240 |
| 6,496,113 B2 | 12/2002 | Lee et al. |
| 6,509,217 B1 | 1/2003 | Reddy |
| 6,665,193 B1 | 12/2003 | Chung et al. |
| 6,761,963 B2 * | 7/2004 | Casper et al. ............. 361/765 |
| 7,109,867 B2 | 9/2006 | Forster |
| 7,286,053 B1 | 10/2007 | Gudeman et al. |
| 7,687,327 B2 * | 3/2010 | Cleeves et al. ............ 438/190 |
| 2007/0007342 A1 | 1/2007 | Cleeves et al. |
| 2007/0108474 A1 | 5/2007 | Kawabata et al. |
| 2007/0273515 A1 | 11/2007 | MacKenzie et al. |

OTHER PUBLICATIONS

International Preliminary Report on Patentability; International Application No. PCT/US2009/044248; Nov. 17, 2010; 8 pages; The International Bureau of WIPO; Switzerland.

(Continued)

*Primary Examiner* — Donghai D. Nguyen
(74) *Attorney, Agent, or Firm* — The Law Offices of Andrew D. Fortney; Andrew D. Fortney; Sharon E. Brown Turner

(57) ABSTRACT

The present invention relates to surveillance and/or identification devices having capacitors connected in parallel or in series, and methods of making and using such devices. Devices with capacitors connected in parallel, where one capacitor is fabricated with a relatively thick capacitor dielectric and another is fabricated with a relatively thin capacitor dielectric achieve both a high-precision capacitance and a low breakdown voltage for relatively easy surveillance tag deactivation. Devices with capacitors connected in series result in increased lateral dimensions of a small capacitor. This makes the capacitor easier to fabricate using techniques that may have relatively limited resolution capabilities.

24 Claims, 11 Drawing Sheets

OTHER PUBLICATIONS

Patrick Smith, Criswell Choi, James M. Cleeves, Vivek Subramanian, Arvind Kamath and Steven Molesa; "Surveillance Devices with Multiple Capacitors"; PCT International Search Report; International Application No. PCT/US2009/44248; Dated May 15, 2009; 2 pages; International Searching Authority/US Commissioner for Patents.

Patrick Smith, Criswell Choi, James M. Cleeves, Vivek Subramanian, Arvind Kamath and Steven Molesa; "Surveillance Devices with Multiple Capacitors", Written Opinion of the International Searching Authority; International Application No. PCT/US2009/44248; Dated May 15, 2009; 7 pages; International Searching Authority/US Commissioner for Patents.

* cited by examiner $C1 > C2$

FIG. 7A
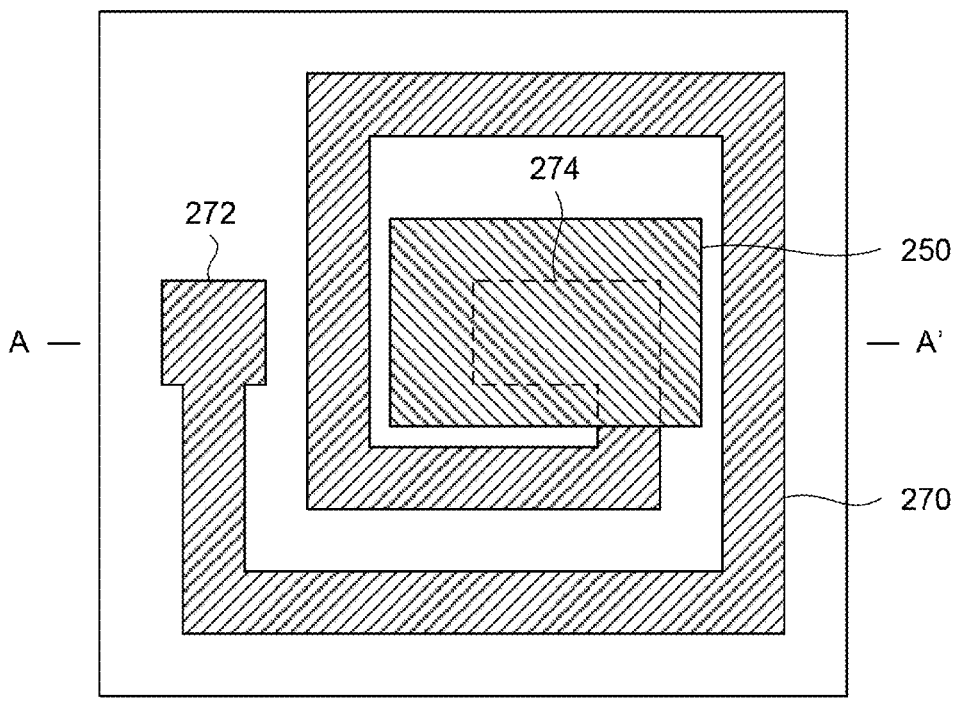
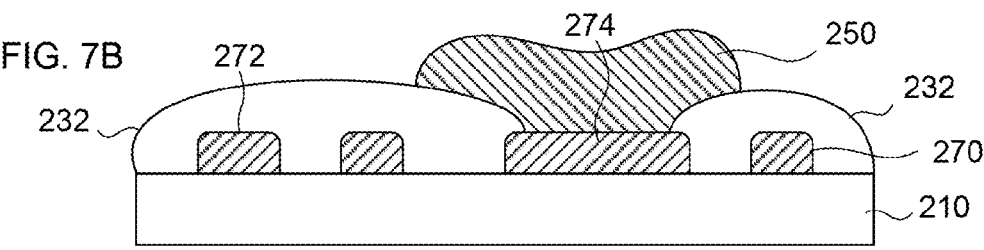
FIG. 7B
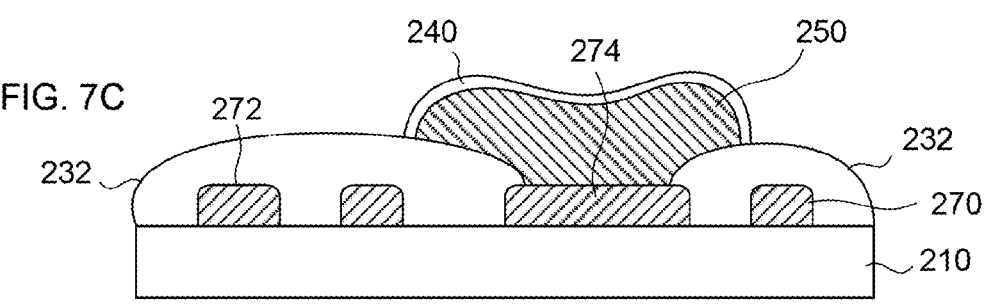
FIG. 7C
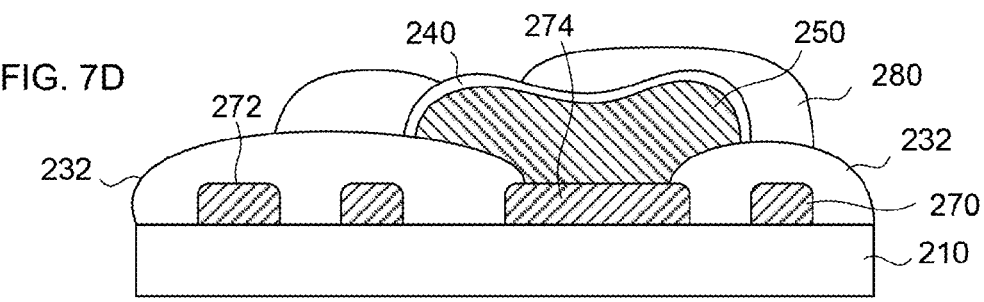
FIG. 7D

METHOD FOR MAKING SURVEILLANCE DEVICES WITH MULTIPLE CAPACITORS

RELATED APPLICATIONS

This application claims the benefit of U.S. Provisional Application Nos. 61/127,899 and 61/056,804, respectively filed on May 15, 2008 and May 28, 2008, each of which is incorporated herein by reference in its entirety.

FIELD OF THE INVENTION

The present invention generally relates to the field of surveillance and/or identification tags and devices. More specifically, embodiments of the present invention pertain to wireless (e.g., EAS, RF, RFID, HF, VHF, UHF, etc.) tags/devices having multiple capacitors connected in parallel or series, structures and methods for their manufacturing and/or production, and methods of using such tags and/or devices.

BACKGROUND

Surveillance devices, such as Electronic Article Surveillance (EAS) devices or tags, are typically fabricated with a capacitor and/or diode, which are permanently altered to detune or deactivate the surveillance device. Fabricating a capacitor with both a low breakdown voltage, and thus, a relatively thin dielectric, while achieving high precision capacitance can be difficult. This is especially true if the capacitor includes an inorganic dielectric film as the dielectric medium. In addition, it is difficult to fabricate a capacitor having very small dimensions with high precision.

SUMMARY OF THE INVENTION

Embodiments of the present invention relate to surveillance/identification tags and devices. More specifically, embodiments of the present invention pertain to wireless (EAS, RF, RFID, HF, VHF, and/or UHF) devices, components thereof (e.g., capacitors, antennas, inductors, etc.), and methods for their manufacture and use. Aspects of the present invention address challenges associated with conventional wireless devices by providing surveillance and/or identification devices having capacitors connected in parallel to achieve both a high-precision capacitance and a low breakdown voltage for easy deactivation, as well as methods of forming and using such devices. Additional aspects of the present invention address the challenges associated with conventional wireless devices by providing surveillance and/or identification devices having capacitors connected in series to increase the lateral dimensions of a small capacitor, thereby making the capacitor easier to fabricate using techniques that may have relatively limited resolution capabilities.

A first aspect of the present invention concerns methods of making surveillance and/or identification devices having multiple capacitors. In some embodiments, the capacitors may be connected in parallel. Making a device with capacitors in parallel may achieve both a high-precision capacitance and a low breakdown voltage for easy surveillance tag deactivation. For example, in embodiments of the present invention, the single capacitor generally used in surveillance and/or identification devices is replaced with a plurality of capacitors, which are connected in parallel. In other embodiments, the capacitors may be connected in series. Making a device with capacitors in series effectively increases the lateral dimensions of a small capacitor. This configuration makes the capacitor easier to manufacture using techniques that may have relatively limited resolution capabilities. For example, in embodiments of the present invention, the single capacitor generally used in surveillance and/or identification devices is replaced with a plurality of capacitors, which are connected in series.

In a first exemplary embodiment, a wireless surveillance and/or identification device having a plurality of capacitors connected in parallel can be made by (a) forming an electrically conducting strap and a lower capacitor electrode on or over a substrate; (b) forming a first dielectric film on the substrate and on or over a portion of the strap, the first dielectric film exposing a portion of the strap and having an opening over a portion of the lower capacitor electrode; (c) forming a capacitor dielectric film in the opening, the capacitor dielectric film having a significantly smaller thickness than the first dielectric film; (d) forming an upper capacitor electrode on the first dielectric film and the capacitor dielectric film, such that the upper capacitor electrode is capacitively coupled to the lower capacitor electrode; and (e) forming an antenna and/or inductor on, or attaching the antenna and/or inductor to, the upper capacitor electrode and the strap.

In exemplary embodiments for making a device with parallel capacitors, the electrically conducting strap and the lower capacitor electrode are formed in a single processing sequence (e.g., by printing), and the lower capacitor electrode is shared by the parallel capacitors. Printing processes may be preferred over conventional blanket deposition, photolithography and etching processes, because printing reduces the number of processing steps, the length of time for the manufacturing process, and/or the cost of materials used to manufacture the capacitor and/or surveillance/identification device.

In a second exemplary embodiment, a wireless surveillance and/or identification device with parallel capacitors can be made by (a) forming an antenna and/or inductor on a substrate and a lower capacitor electrode in electrical communication with a first end of the antenna/inductor; (b) forming a relatively thin capacitor dielectric film on at least a first part of the lower capacitor electrode; (c) forming a relatively thick capacitor dielectric on or over a second part of the lower capacitor electrode, the second part of the lower capacitor electrode not overlapping with the first part thereof; (d) forming an upper capacitor electrode on the thin and thick capacitor dielectric films, capacitively coupled to the lower capacitor electrode; and (e) forming an electrically conducting strap configured to provide electrical communication between the upper capacitor electrode and a second end of the antenna/inductor. Forming the structures and/or layers of the device in such an arrangement (e.g., forming a lower capacitor electrode, the relatively thin and the relatively thick capacitor dielectric films, and an upper capacitor electrode), allows for the formation of parallel capacitors with dielectric film of different thicknesses under controlled and reproducible conditions using the same sequence of steps, and in the case of printing, without photolithography.

According to a third exemplary embodiment, a wireless surveillance and/or identification device with capacitors connected in series can be made by (a) forming a first dielectric film on a conductive (e.g., electrically functional) substrate; (b) forming a plurality of capacitor electrodes on the first dielectric film, the capacitor electrodes being capacitively coupled to the substrate and physically isolated from each other; (c) forming a second dielectric film on or over the capacitor electrodes, the second dielectric film having holes therein to facilitate electrical connection to the capacitor electrodes; and (d) forming an inductor or antenna electrically connected to each of the capacitor electrodes. In such embodiments, the capacitors in series preferably share the conductive substrate as a common lower capacitor electrode.

A second aspect of the present invention concerns surveillance/identification devices having multiple capacitors (e.g., capacitors connected in parallel and/or capacitors connected in series). In a first general embodiment, a surveillance and/or identification device with capacitors connected in parallel comprises (1) an electrically conducting strap on a substrate; (2) a lower capacitor electrode on or over the substrate, electrically connected to the strap; (3) a first dielectric film on the substrate and on or over a portion of the strap, the first dielectric film exposing a portion of the strap and having an opening over a portion of the lower capacitor electrode; (4) a capacitor dielectric film on the lower capacitor electrode in the opening, the capacitor dielectric film having a significantly smaller thickness than the first dielectric film; (5) an upper capacitor electrode on the first dielectric film and the capacitor dielectric film, the upper capacitor electrode capacitively coupled to the lower capacitor electrode; and (6) an antenna and/or inductor electrically connected to the upper capacitor electrode and the strap.

In a second general embodiment, a surveillance and/or identification device with capacitors connected in parallel comprises (1) an antenna and/or an inductor on a substrate; (2) a lower capacitor electrode on or over the substrate and in electrical contact with the antenna and/or inductor; (3) a first dielectric film on or over the antenna and/or inductor and the lower capacitor electrode, the first dielectric film having a hole therein exposing a portion of the antenna and/or inductor and an opening therein over the lower capacitor electrode; (4) a relatively thin capacitor dielectric film on the lower capacitor electrode in the opening in the first dielectric film and having a thickness significantly less than that of the first dielectric film; (5) an upper capacitor electrode capacitively coupled to the lower capacitor electrode; and (6) an electrically conducting strap configured to provide electrical communication between the upper capacitor electrode and the antenna and/or inductor.

In a third general embodiment, a surveillance and/or identification device with capacitors connected in series generally comprises (1) an electrically conductive substrate; (2) a first dielectric film on the electrically conductive substrate; (3) a plurality of capacitor electrodes on the first dielectric film, capacitively coupled to the substrate and physically isolated from each other; (4) a second dielectric layer on or over the capacitor electrodes having one or more holes therein; and (5) an inductor electrically connected to the plurality of capacitor electrodes through the holes.

A third aspect of the present invention concerns a method of detecting items with the surveillance and/or identification devices of the present invention. In general, a surveillance/identification device can be detected by causing or inducing a current in the device that is sufficient for the device to radiate, reflect, absorb, or backscatter detectable electromagnetic radiation, detecting the detectable electromagnetic radiation, and optionally selectively deactivating the device or instructing the device to perform an action.

The embodiments described herein provide surveillance tags and/or devices having high-precision capacitance and a low breakdown voltage to provide relatively reliable tag deactivation and/or high precision printing of capacitors having very small dimension(s). These and other advantages of the present invention will become readily apparent from the detailed description of preferred embodiments below.

BRIEF DESCRIPTION OF THE DRAWINGS

FIGS. 7A-7B show top-down and cross-sectional views, respectively, of another exemplary intermediate in the second exemplary method for making a surveillance and/or identification device with capacitors connected in parallel, according to embodiments of the present invention.

FIG. 7C shows a cross-sectional view of the device of FIG. 7B with a relatively thin capacitor dielectric film formed thereon.

FIG. 7D shows a cross-sectional view of the device of FIG. 7C with a relatively thick dielectric film formed thereon.

DETAILED DESCRIPTION

Figure 1:
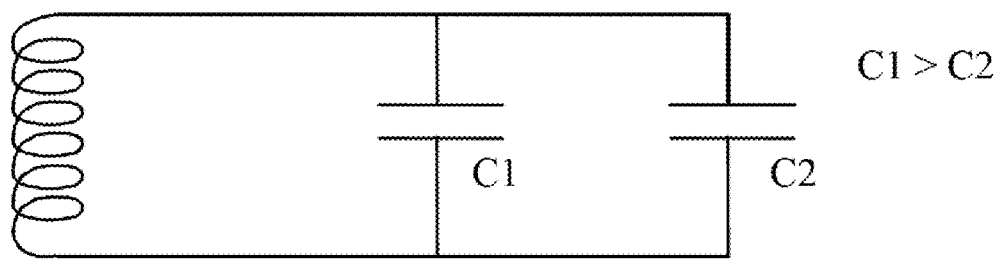
FIG. 1 is a circuit diagram showing a wireless surveillance and/or identification device with capacitors connected in parallel according to the present invention.

Reference will now be made in detail to embodiments of the present invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. In addition, it should be understood that the possible permutations and combinations described herein are not meant to limit the invention. Specifically, variations that are not inconsistent may be mixed and matched as desired.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings Also, for convenience and simplicity, the terms "surveillance," "identification," "EAS," "RF," and "RFID," may be used interchangeably with respect to intended uses and/or functions of a device and/or tag, and the terms "EAS tag" or "EAS device" may be used herein to refer to any EAS and/or surveillance tag and/or device. In addition, the terms "item," "object" and "article" are used interchangeably, and wherever one such term is used, it also encompasses the other terms.

Furthermore, the terms "capacitor electrode" and "capacitor plate" may be used interchangeably. Also, the terms "feature," "shape," "line," and "pattern" may be used interchangeably, and generally refer to an electrically conductive structure of a semiconductor device. The term "(semi)conductor," "(semi)conductive" and grammatical equivalents thereof refer to materials, precursors, layers, features or other species or structures that are conductive and/or semiconductive.

In the present application, the term "deposit" (and grammatical variations thereof) is intended to encompass all forms of deposition, including blanket deposition (e.g., CVD, ALD, and PVD), (spin)coating, and printing. In general, "coating" refers to a process where an ink or other material is deposited on substantially the entire substrate or surface, whereas "printing" generally refers to a process where an ink or other material is deposited in a predetermined pattern in certain areas of the substrate or surface. In various embodiments, coating may comprise spin-coating, spray-coating, slit coating, extrusion coating, meniscus coating, and/or pen-coating. In other embodiments, printing may comprise inkjet printing, gravure printing, offset printing, flexographic printing, screen printing, microspotting, stenciling, stamping, syringe dispensing, pump dispensing, laser forward transfer, local laser CVD, and/or pen-coating.

Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. In addition, the term "doped" refers to a material that is doped with a substantially controllable dose of any dopant (e.g., lightly doped, heavily doped, or doped at any doping level in between).

In the present disclosure, the phrase "consisting essentially of a Group IVA element" does not exclude intentionally added dopants, which may give the Group IVA element certain desired (and potentially quite different) electrical properties. The term "(poly)silane" refers to compounds or mixtures of compounds that consist essentially of (1) silicon and/or germanium and (2) hydrogen, and that predominantly contain species having at least 10-15 silicon and/or germanium atoms. Such species may be linear, branched, or crosslinked, and may contain one or more cyclic rings. The term "(cyclo)silane" refers to compounds or mixtures of compounds that consist essentially of (1) silicon and/or germanium and (2) hydrogen, and that may contain one or more cyclic rings and less than 10-15 silicon and/or germanium atoms. In a preferred embodiment, the silane has a formula $Si_xH_y$, where x is from 3 to about 200, and y is from x to (2x+2), where x may be derived from an average number molecular weight of the silane. The term "hetero(cyclo)silane" refers to compounds or mixtures of compounds that consist essentially of (1) silicon and/or germanium, (2) hydrogen, and (3) dopant atoms such as B, P, As or Sb that may be substituted by a conventional hydrocarbon, silane or germane substituent and that may contain one or more cyclic rings.

Various embodiments of the present invention relate to surveillance and/or identification tags or devices comprising a plurality of capacitors connected in parallel, and methods of forming such tags or devices. Other embodiments of the present invention relate to surveillance and/or identification tags or devices comprising a plurality of capacitors connected in series, and methods of forming the same. Still, further embodiments of the present invention relate to methods of detecting items using the various surveillance/identification tags described herein.

The invention, in its various aspects, will be explained in greater detail below with regard to exemplary embodiments. While the embodiment relate primarily to surveillance and/or security tags/devices, the present methods and structures are also useful in identification and other wireless devices that include one or more antennas and/or inductors, capacitors, and connections therebetween.

Exemplary Surveillance and/or Identification Device Circuits Having Multiple Capacitors According to embodiments of the present invention, a device can have or be manufactured with a plurality of capacitors connected in parallel and/or a plurality of capacitors connected in series. FIG. 1 shows a circuit diagram of an exemplary device manufactured with capacitors connected in parallel according to the present invention. As shown in FIG. 1, two capacitors, C1 and C2, are connected in parallel, and C1 may be larger than C2. In exemplary embodiments, C1 is substantially larger than C2. Despite the relative capacitances of C1 and C2, the larger capacitor C1 may be fabricated with a thicker dielectric, which results in capacitor C1 having a substantially larger area than capacitor C2. Such a large-area capacitor can be manufactured to a high precision of capacitance (e.g., to precisely control the overall capacitance) because the large geometric features are within the tolerances of the printing or patterning processes used to define the capacitor. The relatively thick dielectric film of the large-area capacitor C1 allows the thickness to be controlled to a finer precision than a very thin dielectric film generally allows. In contrast, the smaller capacitor C2 is fabricated with a much thinner dielectric, which allows this smaller capacitor to break down at a relatively low voltage. Generally, a relatively low, controllable capacitor breakdown voltage is useful for surveillance or security tag deactivation. Furthermore, the capacitance of C2 is much smaller than that of C1, so that C2 can be fabricated with a relatively poor precision compared to that of C1, and still have a relatively minor effect on the overall precision of the net capacitance C1+C2.

Figure 2:
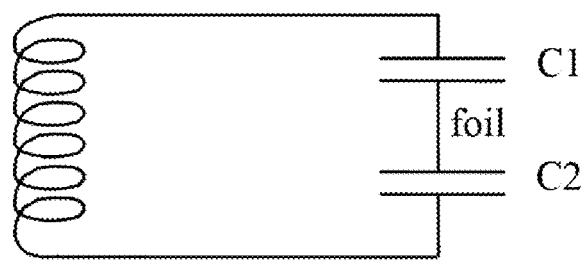
FIG. 2 is a circuit diagram showing a wireless surveillance and/or identification device with capacitors connected in series according to the present invention.

FIG. 2 shows a circuit diagram of an exemplary device fabricated with capacitors connected in series according to the present invention. As shown in the example of FIG. 2, two capacitors, C1 and C2, are connected in series, and they share a common electrode (labeled "foil" in FIG. 2). In this embodiment, the capacitances add in series to an effective capacitance of CT as shown in the formula: 1/CT=1/C1+1/C2. If C1=C2, both C1 and C2 are twice the capacitance of the net capacitance CT, and therefore twice as large (in area) as a single capacitor having capacitance CT would be. Consequently, this may increase the dimensions (and thus the manufacturing margins) for any printing or patterning steps that may be used to define the capacitor area.

Exemplary Methods of Making a Surveillance and/or Identification Device with Multiple Capacitors Exemplary embodiments for manufacturing devices with parallel and series capacitors are discussed herein. In addition, a detailed discussion regarding general methods that may be used to form any of the devices described in the various embodiments, as well as the individual structures of such devices, is also provided herein.

A First Exemplary Method for Making Devices with Parallel Capacitors

Figure 3A:
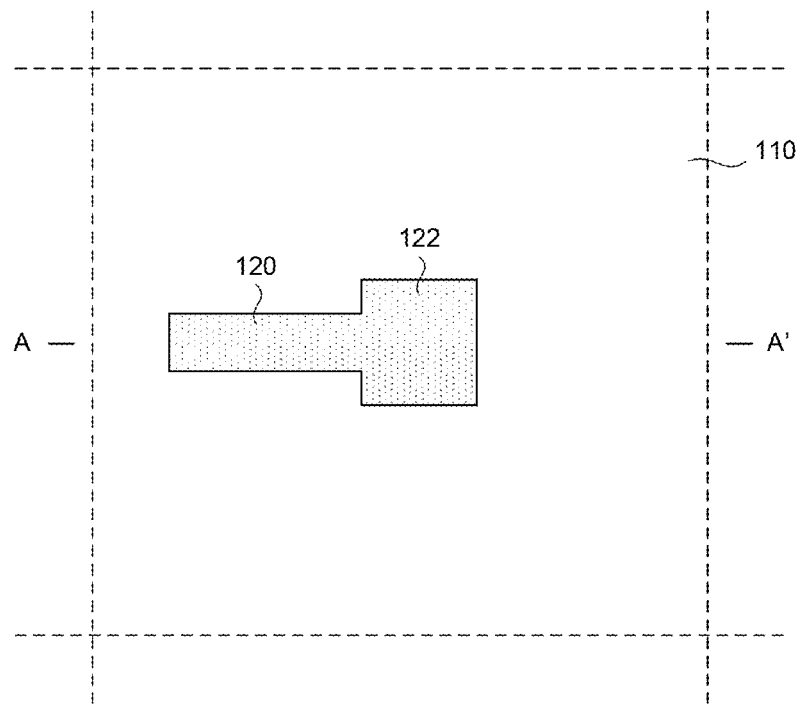
FIGS. 3A-3B show top-down and cross-sectional views, respectively, of an exemplary intermediate in a first exemplary method for making a surveillance and/or identification device with capacitors connected in parallel, according to embodiments of the present invention.

A first general method for making a surveillance and/or identification device with capacitors connected in parallel is discussed herein with regard to FIGS. 3A-5B. FIG. 3A shows a top-down view, of a substrate 110 having an electrically conducting strap 120 (e.g., "feature," "line," "pattern," and/or "shape") and a lower capacitor electrode 122 formed thereon or thereover. The dashed lines in FIG. 3A forming a square or rectangle represent lines along which an array of substrates, each having integrated circuitry formed thereon, are separated. These lines may represent perforations in a polymeric sheet or web, scribe lines in a semiconductor wafer or on a glass sheet or slip, or lines along which a metal sheet or foil is cut, or separate the individual integrated circuits from each other. FIG. 3B shows a cross-sectional view of FIG. 3A along the A-A' axis. The electrically conducting strap 120 is formed on the substrate to provide electrical communication between the upper capacitor electrode(s) and the antenna/inductor, which are subsequently formed as shown in FIGS. 4A-5B as discussed herein.

i. Preparing the Substrate

In general, the substrate used to manufacture a wireless tag or device may comprise a conductive, semiconductive, or insulative material, depending somewhat on the method of making the device. In preferred variations of the first exemplary method, the substrate comprises an insulating material. However, the substrate may also comprise a conductive or semiconductive material having one or more insulating layers thereon, as shown in FIG. 3C. Referring to FIG. 3C, the substrate 110 may comprise a layered structure. For example, the substrate 110 may include a metal (e.g., aluminum, stainless steel, copper, etc.) foil or sheet 102 (or other conductive/semiconductive material) with one or more insulating layers thereon (e.g., layers 104a and/or 104b). In such embodiments, the insulating layer 104a may be an oxide of a metal in the metal substrate (e.g., aluminum oxide), or alternatively, a blanket-deposited or coated insulator layer (e.g., a ceramic or glass such as silicon dioxide, a polymer, an inorganic insulator, an organic insulator, etc.). When present, a second layer 104b may also be part of the substrate, and in one embodiment, layer 104b comprises the same material as the first insulating layer 104a.

Other suitable conductive, semiconductive, and insulative materials are described herein with regard to exemplary surveillance/identification devices with multiple capacitors and/or methods of forming the same. In implementations comprising a conductive substrate, the metal for the conductive substrate may be chosen at least in part based on its ability to be anodized into an effective dielectric. In exemplary embodiments, the substrate may have a nominal thickness of from 1-200 μm (preferably 20-100 μm in those embodiments in which a high Q is advantageous, such as certain EAS and/or surveillance devices). Furthermore, conductive substrates may have a resistivity of 0.1-100 μohm-cm (preferably 0.5-80 μohm-cm), or any range of values therein. Additionally, prior to subsequent processing, the conductive substrate may be conventionally cleaned and smoothed. This surface preparation may be achieved by chemical polishing, electropolishing and/or oxide stripping to reduce surface roughness and remove low quality native oxides. A description of such processes is given in "The Surface Treatment and Finishing of Aluminum and Its Alloys," by P. G. Sheasby and R. Pinner, 6$^{th}$ ed., ASM International, 2001, the relevant portions of which are incorporated herein by reference. Alternatively, one or both of insulating layers 104a-b can be formed by spin-coating or dip-coating a liquid phase insulator precursor solution (e.g., a spin-on glass [SOG] formulation) onto the substrate. In some implementations, insulating layer 104a may be formed using a blanket deposition process as described herein (e.g., CVD, PVD, ALD, etc.). In some variations, an adhesive layer (e.g., 104b in FIG. 3C) may be added to a face of the substrate (e.g., opposite to the interface with an antenna and/or inductor or other circuit element) for attaching the device to an item, generally after the remainder of the tag is fabricated.

ii. Forming the Electrically Conducting Strap

Referring again to FIG. 3B, an electrically conducting strap 120 is formed on the substrate 110. In general, the electrically conducting strap 120 can be formed by any suitable method known in the art. For example, in exemplary embodiments, the strap 120 may be formed by printing processes such as inkjet printing, microspotting, stenciling, stamping, syringe dispensing, pump dispensing, screen printing, gravure printing, offset printing, flexography, laser forward transfer, and/or local laser CVD. In such printing processes, the strap 120 and lower capacitor electrode 122 may be formed by selectively printing a conductor ink (e.g., metal ink, metal precursor ink, etc.) on the substrate. Exemplary conductor ink and ink formulations are discussed in detail herein. In embodiments comprising a conductive substrate 110, the strap 120 may be printed on an insulating layer (e.g., 104a in FIG. 3C) that was previously deposited on the substrate using any suitable method known in the art (see, e.g., the section herein entitled, "Forming the Dielectric Film Layers").

In other embodiments, forming the strap may comprise depositing a conductive material on the substrate 110 (or on an insulating layer 104a on a conductive substrate), and then etching the conductive material to form the desired pattern (e.g., 120/122). For example, a conductive material may be blanket deposited or coated on the substrate 110. Then, portions of the conductor material that are not covered by a mask (e.g., the unmasked regions of the conductor material) are selectively etched. Alternatively, the strap 120 may be formed by printing a conductive seed layer, and then electroplating or electrolessly plating a bulk conductor thereon (see, e.g., U.S.

patent application Ser. Nos. 12/131,002, 12/175,450, and 12/243,880, respectively filed on May 30, 2008, Jul. 17, 2008, and Oct. 1, 2008, the relevant portions of which are incorporated herein by reference).

The electrically conducting strap 120 may be formed using any of the conductive materials/metals as discussed herein. In some implementations, the strap 120 and the lower capacitor electrode (e.g., structure 122 of FIG. 3A) are formed at the same time, in a single processing sequence or step. In such embodiments, the lower capacitor electrode 122 may be shared by (or common to) the parallel capacitors. In such implementations, the strap 120 and the lower capacitor electrode 122 may comprise or consist essentially of silver, gold, copper, palladium, aluminum, tungsten, titanium, a multilayer laminate thereof, or a conductive alloy thereof. In exemplary embodiments, the strap 120 and lower capacitor electrode 122 may be formed using the same material as one or more subsequently-formed upper capacitor electrodes and/or antennas/inductors. However, the invention is not limited as such, and the strap 120 and lower capacitor electrode 122 may be made using different materials than those of the upper/lower capacitor electrode(s) and/or the antenna/inductor.

iii. Forming the Capacitor Dielectric Films

Figure 3B:
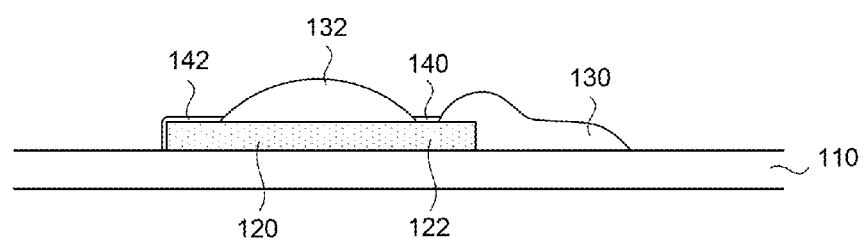
Figure 3C:
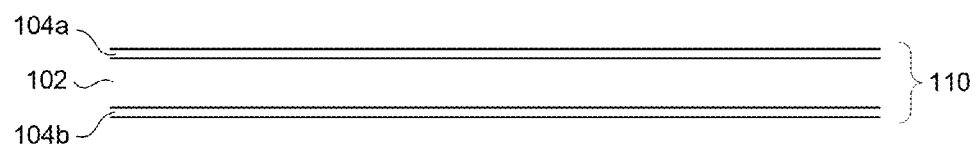
FIG. 3C shows a cross-sectional view of an exemplary multi-layered substrate according to embodiments of the present invention.

Referring to FIG. 3B, the present method further comprises the step of depositing or forming a first (capacitor) dielectric film 130/132 on at least a portion of the substrate 110, and on or over a portion of the strap 120 and lower capacitor electrode 122. In some implementations, the first dielectric film 130/132 may comprise an interlayer dielectric film (ILD). Thus, in exemplary embodiments, the dielectric film 130/132 may be formed such that its thickness is from 2,000 to 20,000 Å, or any range of values therein. In certain implementations, the dielectric film 130/132 may have a thickness of from 3,000 to 5,000 Å.

In exemplary embodiments, the first dielectric film 130/132 exposes a portion (e.g., a predetermined region) of the strap 120, and forms a contact hole or opening exposing a portion (e.g., a predetermined region) of the lower capacitor electrode 122. The first dielectric film 130/132 having the contact hole therein may be formed using any of the methods described in detail herein (e.g., blanket deposition, photolithography and etching, selective deposition by printing, etc.). The first dielectric layer 130/132 provides an electrical separation (e.g., in terms of leakage and capacitance) between a subsequently formed antenna and/or inductor and the electrically conducting strap 120.

Next, a capacitor dielectric film 140 is formed on the electrically conducting strap 120, including the region exposed by the opening in the first dielectric film 130 as described herein. The capacitor dielectric film 140 generally has a significantly smaller thickness than that of the first dielectric film 130/132. In some alternate embodiments, the relatively thin capacitor dielectric film 140 may be formed on the strap 120 and the lower capacitor electrode 122 in a predetermined pattern prior to forming the first dielectric film 130/132, using any of the methods described herein. In some variations, some portion(s) of the capacitor dielectric film formed on the strap 120 (e.g., structure 142 of FIG. 3B) may be removed as desired by selectively etching to expose a portion of the strap 120 for electrical connection to a subsequently formed inductor and/or antenna, generally after masking portion 140 in the contact hole to preserve it for use as a thin capacitor dielectric (e.g., for capacitor C2 in FIG. 1).

In general, the dielectric film layers (e.g., the interlayer dielectric and/or relatively thick capacitor dielectric layer 130/132, the relatively thin dielectric layer 140, etc.) and the contact holes formed therein may be made using techniques and materials known in the art. For example, in some embodiments, the dielectric film is coated or deposited over the entire device by blanket deposition techniques known in the art. For example, blanket deposition of the dielectric film layers may be done by extrusion coating, blade coating, dip coating, linear coating, spin coating or other coating techniques, or in the alternative, by local deposition techniques such as printing or dispensing. Selected portions of the dielectric film are removed (e.g., by conventional photolithography and etching) to form contact holes or openings over (or to expose) desired regions of underlying conductive structures (e.g., the capacitor electrode(s) 122, the strap 120, etc.). Such blanket deposition and etching processes are described in detail in U.S. patent application Ser. Nos. 11/452,108, 11/888,949, and 11/818,078, respectively filed Jun. 12, 2006, Aug. 3, 2007, and Jun. 12, 2007, the relevant portions of which are incorporated herein by reference.

In some embodiments, the dielectric film(s) 130/132 and/or 140/142 can be deposited by vacuum deposition methods (e.g., chemical vapor deposition [CVD], plasma-enhanced chemical vapor deposition [PECVD], low-pressure chemical vapor deposition [LPCVD], sputter deposition, etc.). Another method of forming the thin dielectric 140/142 employs anodization to form a MOS dielectric and/or a deactivation dielectric). A detailed description of forming the thin dielectric 140/142 by anodization is found in U.S. Pat. No. 7,286,053, the relevant portions of which are incorporated herein by reference.

In alternative embodiments, the dielectric films 130/132 and/or 140/142 may be formed by depositing a dielectric precursor material (e.g., by printing or chemical bath deposition processes), and then converting the precursor to a dielectric film (e.g., by drying, curing, and/or annealing). However, methods such as printing or vapor deposition (e.g., CVD, physical vapor deposition [PVD], etc.) are preferred if the conductive substrate is one that cannot be processed at high temperatures (e.g., above 200° C., 250° C., 550° C., 600° C., or any other temperature above 200° C.). The dielectric precursor material may comprise a liquid-phase dielectric precursor ink. In one embodiment, the liquid-phase dielectric precursor ink may comprise a compound of the formula $A_nH_y$, where n is from 3 to 12, each A is independently Si or Ge, and y is an even integer of from n to 2n+2, and preferably a compound of the formula $(AH_z)_n$, where n is from 5 to 10, each A is independently Si or Ge, and each of the n instances of z is independently 1 or 2. A corresponding silicon and/or germanium oxide film may be formed by curing the precursor film as described herein. After the precursor material has been converted to the dielectric film, additional metal oxides (e.g., $TiO_2$, $ZrO_2$, $HfO_2$, etc.) or other dielectric (e.g., silicon nitride, silicon oxynitride, aluminum oxynitride, aluminosilicates, etc.) may be deposited on the film. Thus, in some variations, the dielectric films may comprise a plurality of layers.

In the case of printing, the process may also serve the purpose of patterning the dielectric films. Patterning of the dielectric films may be done by direct printing of one or more dielectric precursor materials (e.g., by inkjet printing, screen printing, gravure printing, flexography, laser forward transfer, etc.) or by indirect patterning (such as with a photo- and/or thermo-patternable precursor material that is exposed by a photomask, thermal or laser pattern and developed, or extrinsically via a patterning process such as conventional photolithography, etching, embossing or similar technique). In some implementations, the etching process may comprise laser ablation, mechanical penetration or other etching or dielectric removal techniques known in the art.

In alternate embodiments, the dielectric films 130/132 and/or 140/142 may be selectively deposited on one or more predetermined portions of the structure (e.g., the substrate, the strap, and/or the lower electrode) to form a desired pattern. In preferred embodiments, selective deposition may be accomplished using any of the various printing processes and techniques discussed herein. Specifically, in some implementations, the dielectric film layers may be formed by (i) printing a liquid-phase composition (e.g., a solution, suspension, emulsion, ink, etc., containing a dielectric precursor) on at least predetermined portions of the device, in a predetermined pattern and with a characteristic resolution (e.g., minimum layout dimension, spacing, alignment margin of error, or any combination thereof), and (ii) drying and/or curing (e.g., by annealing) the dielectric composition to form the dielectric film. In such embodiments, materials such as spin-on-glasses and/or boron nitride can be selectively printed on the device as desired. Other suitable dielectric materials and dielectric precursor inks are described in detail herein.

In preferred variations, a liquid-phase dielectric material (e.g., a dielectric precursor ink as described herein) may be selectively printed on the structure such that a contact hole or opening is formed to expose one or more portions of the lower conductive structures (e.g., 120 and/or 122) as desired. In the alternative, the dielectric film/layers may be printed to cover the entire substrate, and then etched using subsequently formed structures as a mask to form the desired dielectric film pattern.

In exemplary embodiments, the dielectric films 130/132 and/or 140/142 may be formed by thermal and/or chemical oxidation processes. In some implementations, the dielectric films may be formed (e.g., grown) by oxidizing and/or nitriding a conductive film, substrate or other structure (such as a liquid oxide/nitride precursor). Generally, this may be done in an oxidizing and/or nitriding atmosphere. For example, the dielectric films can be formed by oxidizing a liquid silane printed onto the structure, or by coating the structure with another conductive material that can be oxidized or nitrided (e.g., silicon, aluminum, chromium, hafnium etc.). In the alternative, the dielectric film may be formed by depositing (e.g., by printing liquid phase or chemical bath deposition processes) a dielectric precursor material (e.g., a $SiO_2$ precursor such as tetraalkylsiloxane or tetraalkoxysilane) and subsequently converting the precursor to a dielectric film (e.g., by drying, curing, and/or annealing). In one embodiment, the relatively thin capacitor dielectric film 140 is grown on the strap 120 and the lower capacitor electrode 122 by anodization, or alternatively, by chemically or thermally oxidizing and/or nitriding the strap and lower electrode 120/122 as described herein, and the relatively thick dielectric film 130/132 is deposited on the substrate by blanket deposition or a printing process as described herein. In some alternate embodiments, the dielectric film 130/132 and/or the dielectric film 140/142 may be formed by atomic layer deposition (ALD). Other techniques for forming the dielectric films, and the benefits thereof, are described in U.S. Pat. No. 7,286,053, the relevant portions of which are incorporated herein by reference.

The liquid-phase dielectric precursor ink used in the above-described printing and/or coating processes may comprise a glass-forming formulation, an organic dielectric, an oxidized silicon precursor, or molecular and/or nanoparticle based silicon formulation as described herein. The corresponding dielectric film may be formed by curing the precursor film (e.g., Group IVA element precursor film) in an oxidizing atmosphere, at a temperature of 300° C., 350° C. or 400° C. or more, but in embodiments including a conductive substrate, less than the melting temperature of the substrate. Curing may be done in the presence of oxygen, ozone, $N_2O$, $NO_2$, or other oxidizing gas, which may be diluted in an inert carrier gas such as nitrogen, argon or helium. In the alternative, other solution-based dielectrics (e.g., organic dielectrics), may be applied by printing or other conventional coating steps.

The dielectric films may be formed using any suitable electrically insulating dielectric material as discussed herein. In various embodiments, the relatively thin dielectric film (e.g., structure 140 of FIG. 3B) is formed such that its thickness is from 50 to 500 Å and/or it has a breakdown voltage of from about 5 V to less than 50 V, preferably from 4 V to 15 V, depending on factors such as Q, the thickness of the dielectric film, etc. Such thin films are advantageously formed by thermal and/or chemical oxidation. However, the thickness of each dielectric film (e.g., the first dielectric film, the capacitor dielectric film, the ILD, etc.) may be adjusted as needed to control capacitance and/or to control the voltage at which the dielectric film is intended to rupture.

iv. Forming the Upper Capacitor Electrode(s)

Figure 4A:
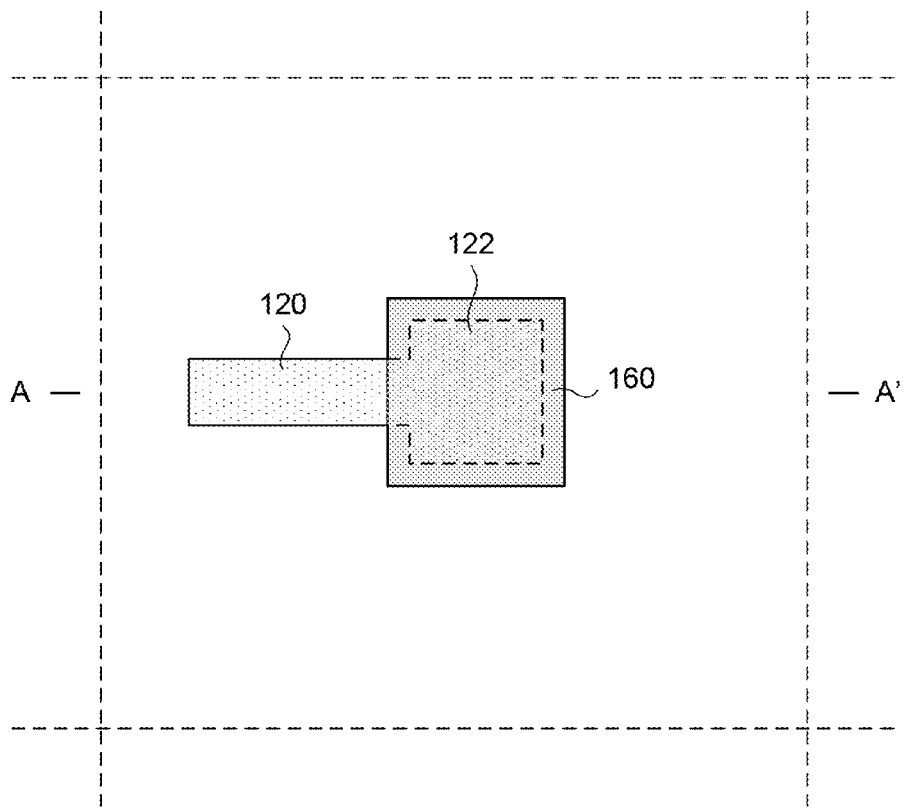
FIGS. 4A-4B show top-down and cross-sectional views, respectively, of another exemplary intermediate in the first exemplary method for making a surveillance and/or identification device with capacitors connected in parallel, according to embodiments of the present invention.
Figure 4B:
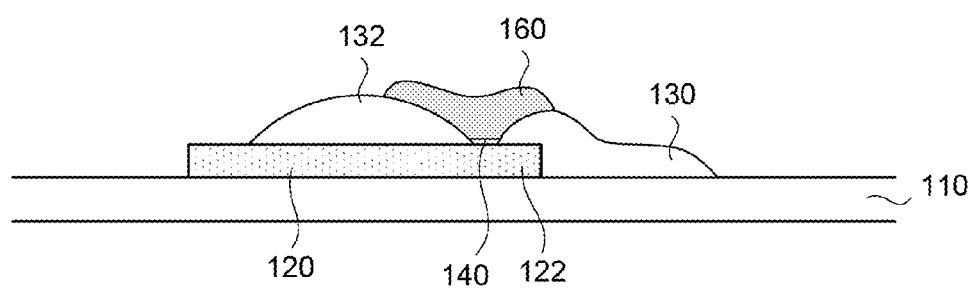

FIG. 4A shows a top-down view of an upper capacitor electrode 160 formed on the first dielectric film 130/132 and the relatively thin capacitor dielectric film 140. FIG. 4B shows a cross-sectional view of FIG. 4A along the A-A' axis. In general, the upper capacitor electrode 160 is capacitively coupled to the lower capacitor electrode 122, and forms first and second capacitors connected in parallel. In exemplary embodiments, the second capacitor includes the relatively thick capacitor dielectric film (e.g., the first dielectric film 130/132) and has a much greater area than that of the first capacitor which is formed across capacitor dielectric film 140. Thus, the second capacitor has a greater capacitance than the first capacitor.

In general, the capacitor electrode(s) of the various embodiments (e.g., upper and/or lower capacitor electrodes) may be formed using any suitable technique known in the art (e.g., blanket deposition, photolithography and etching, printing, etc.). For example, in various implementations, a conductive material is blanket deposited by spin-coating an ink (e.g., a conductor ink, a metal precursor ink, a semiconductor ink, etc.) containing the conductive material (e.g., a compound and/or nanoparticles of a metal, such as an organometallic precursor and/or metal nanoparticles), and the ink is subsequently cured or annealed. In preferred alternate embodiments, the metal ink is selectively deposited by printing an ink comprising a precursor of a desired metal (e.g., a silicide-forming metal) in a solvent, and subsequently dried, cured, and/or annealed.

The conductive (e.g., metal-containing) material may be printed using any of the techniques described herein. Printing processes allow for greater control of the thickness of the printed metal layer, and thus greater control of the thickness of the upper electrode. For example, if a thicker upper electrode is desired, the number of drops, the drop volume, or the ink volume can be increased. A thicker electrode (e.g., metal layer) may also be achieved by decreasing the pitch between drops in an area where the thicker electrode (e.g., having lower resistance) is desired. Furthermore, printing processes allow the contact angle of the printed ink to be varied locally. To illustrate, a preprinting step adapted to locally vary the surface energy of the substrate can be performed so that different metal heights/thicknesses and/or line widths can be achieved with a single printing step. Exemplary methods for varying surface energy prior to printing are described in detail in U.S. patent application Ser. No. 12/175,450, filed on Jul. 17, 2008, the relevant portions of which are incorporated herein by reference.

In various implementations, the conductor ink may comprise precursors of any of the elemental metals described herein (e.g., titanium, tungsten, nickel, palladium, platinum, etc).

Additionally or alternatively, the conductor ink may comprise a conventional alloy of such elemental metals, such as aluminum-copper alloys, aluminum-silicon alloys, aluminum-copper-silicon alloys, titanium-tungsten alloys, molybdenum-tungsten alloys, aluminum-titanium alloys, etc. In other implementations, electrically conductive metal compounds, such as nitrides and/or silicides of elemental metals (e.g., titanium nitride, titanium silicide, TiSiN, tantalum nitride, cobalt silicide, molybdenum silicide, tungsten silicide, WN, WSiN, platinum silicide, etc.) may be used in the conductor ink formulation. Printable silicide-forming precursor formulations, and methods of forming such printable formulations, are described in co-pending U.S. patent application Ser. No. 12/131,002, filed May 30, 2008, the relevant portions of which are incorporated herein by reference.

In other implementations, the metal/conductor ink comprises one or more metal precursors selected from the group consisting of metal nanoparticles, organometallic compounds, and metal salts, in a solvent in which the metal precursor(s) are soluble. In exemplary implementations, the metal of the conductor ink is able to withstand high-temperature processing, such as temperatures greater than 660° C., 800° C., 900° C., 1,000° C., or any or temperature greater than 660° C. Examples include chromium, molybdenum, tungsten, nickel, palladium, platinum, and conventional metal alloys thereof (e.g., nickel-chromium alloys, titanium-tungsten alloys, molybdenum-tungsten alloys, etc.).

In some variations, the ink precursor for the capacitor electrodes may comprise nanoparticles and/or molecular, oligomeric and/or polymeric compounds of silicon, silicide forming metals (e.g., Ni, Co, Pd, Pt, Ti, W, and/or Mo), refractory metals (e.g., Pd, Mo, and/or W), or combinations thereof. The nanoparticles or nanocrystals in the ink formulation may be passivated or unpassivated, as described in U.S. Pat. Nos. 7,422,708, 7,294,449, 7,485,691, and 7,491,782, and in co-pending U.S. application Ser. Nos. 10/616,147, 11/373,696, 11/867,587, 11/888,949, and 11/888,942, respectively filed Jul. 8, 2003, Mar. 10, 2006, Oct. 4, 2007, Aug. 3, 2007, and Aug. 3, 2007, the relevant portions of which are incorporated herein by reference.

In exemplary embodiments, the metal-containing ink may comprise or consist essentially of the metal precursor (e.g., metal-containing material) in an amount of from 1 to 50 wt. % of the ink (or any range of values therein), and a solvent in which the metal-containing material is soluble. In exemplary embodiments, the metal ink comprises any of the elemental metals described herein (e.g., aluminum, nickel, gold, palladium, platinum, etc.), or alloys thereof.

In some embodiments, the ink formulation may consist essentially of one or more Group 4, 5, 6, 7, 8, 9, 10, 11, or 12 metal salt(s) and/or metal complex(es), one or more solvents adapted to facilitate coating and/or printing of the formulation. Optionally, the formulation may include one or more additives that form gaseous or volatile by-products upon reduction of the metal salt or metal complex to an elemental metal or alloy thereof. In further embodiments, the ink formulation may further consist essentially of (or the additive may comprise) an anion source, adapted to facilitate dissolution of the metal salt or metal complex in the solvent. Such ink formulations and methods of forming the same are described in co-pending U.S. patent application Ser. No. 12/131,002, the relevant portions of which are incorporated herein by reference.

In some implementations, the conductor ink comprises a semiconductor. In various embodiments, the semiconductor may be heavily doped. In the case of silicon or silicon-germanium, the dopant may be selected from the group consisting of boron, phosphorous and arsenic, typically in a conventional concentration (e.g., from $10^{17}$ to $10^{21}$, $10^{18}$ to $10^{21}$, $10^{19}$ to $10^{21}$ atoms/cm$^2$ or any range of values therein). Suitable semiconductor inks may further comprise a liquid-phase (poly)- and/or (cyclo)silane. Liquid-phase semiconductor inks may further comprise a semiconductor nanoparticle (such as passivated Si, Ge, or SiGe nanoparticles) and/or a solvent (e.g., an organic solvent or a mixture thereof, $NH_3$, $H_2O$, a $C_1$-$C_{10}$ alcohol, cycloalkane, etc.; see U.S. Pat. Nos. 7,422,708, 7,294,449, and 7,485,691, and U.S. patent application Ser. Nos. 11/867,587 and 12/131,002, filed on Oct. 4, 2007 and May 30, 2008, respectively, the relevant portions of each of which are incorporated herein by reference). The nanoparticles, or nanocrystals, of such formulations may be conventionally passivated with one or more surfactants or surface ligands such as alkyl, aralkyl, alcohol, alkoxy, mercaptan, alkylthio, carboxylic acid, and/or carboxylate groups. In the alternative, the nanoparticles/nanocrystals may be unpassivated.

In other embodiments, the semiconductor ink may comprise one or more semiconductor compounds (e.g., a [doped] Group IV compound such as SiGe or SiC, III-B compounds such as GaAs, chalcogenide semiconductors such as CdS, ZnO and ZnS, organic semiconductors, etc.), and/or one or more semiconductor nanoparticles (e.g., Si, Ge, SiGe, etc.), along with a solvent in which the nanoparticles/compounds are soluble or suspendable (e.g., a $C_6$-$C_{20}$ branched or unbranched alkane that may be substituted with one or more halogens, a $C_5$-$C_{20}$ cycloalkane such as cyclohexane, cyclooctane or decalin, a $C_6$-$C_{10}$ aromatic solvent such as toluene, xylene, tetralin, a di-$C_1$-$C_{10}$ alkyl ether having a total of at least 4 carbon atoms, and/or a $C_4$-$C_{10}$ cyclic alkyl ether such as tetrahydrofuran or dioxane, etc.). The ink formulation may also comprise a surface tension reducing agent, a surfactant, a binder and/or a thickening agent. However, such additives or agents may be omitted. Various exemplary ink formulations, methods for making such ink formulations, and methods of forming conductive structures and/or layers from such inks are described in U.S. Pat. Nos. 7,314,513, 7,498, 317, 7,422,708, 7,294,449, 7,485,691, 7,491,782, and in co-pending U.S. patent application Ser. Nos. 10/616,147, 11/373,696, 11/452,108, 11/888,949, 11/888,942, 11/867, 587, and 12/131,002, filed on Jul. 8, 2003, Mar. 10, 2006, Jun. 12, 2006, Aug. 3, 2007, Aug. 3, 2007, Oct. 4, 2007, and May 30, 2008, respectively, the relevant portions of which are incorporated herein by reference.

In some embodiments, the (upper) capacitor electrode(s) 160 may be printed as a mixture of two or more metal precursors, or alternatively, of one or more metal precursors, and one or more semiconductor precursors. In other embodiments, two or more metal inks may be successively printed and dried as laminated layers. The mixtures and/or laminates can be optionally heated or otherwise reacted during or after formation to form the (semi)conductive layer 160.

The printed metal-containing/precursor ink may be dried by heating the substrate at a temperature and for a length of time sufficient to remove any solvent in the ink. Temperatures for removing solvents range from about 80° C. to about 150° C., or any range of temperatures therein (e.g., from about 100° C. to about 120° C.). The lengths of time for removing solvents from a printed ink within these temperature ranges are from about 1 second to about 10 minutes, 10 seconds to about 5 minutes, or any other range of times therein (e.g., from about 30 seconds to about 5 minutes, or about 1 minute to 3 minutes, etc.). Heating may take place on a conventional hotplate or in a conventional furnace or oven. Optionally, the heating may occur in an inert atmosphere as described in co-pending U.S. patent application Ser. No. 11/888,949, filed Aug. 3, 2007, the relevant portions of which are incorporated herein by reference.

After the metal-containing ink has been dried to remove the solvent, the remaining material may be subject to an annealing process (e.g., curing) at a temperature and for a length of time sufficient to obtain desired electrical and/or physical properties, as well as proper adhesion to the underlying dielectric layer. Annealing temperatures range from about 100° C. to about 300° C., or any range of temperatures therein (e.g., from about 150° C. to about 250° C., etc.). The annealing time generally ranges from about 1 minute to about 2 hours. In preferred embodiments, the metal-containing film is annealed from about 10 minutes to about 1 hour, or any range of values therein (e.g., from about 10 to about 30 minutes, etc.).

In various embodiments, annealing occurs in a furnace or oven, and optionally in an inert or reducing atmosphere. For example, the metal-containing precursor film may be exposed to a reducing agent, and heated at a temperature ranging from greater than ambient temperature to about 200-400° C., depending on the substrate. This process has particular advantages in embodiments where the substrate cannot be processed at a relatively high temperature (e.g., aluminum foil, a polycarbonate, polyethylene and polypropylene esters, a polyimide, etc.). A sealable oven, furnace, or rapid thermal annealing furnace configured with a vacuum source and reducing/inert gas sources may be used for providing the reducing atmosphere and heat (thermal energy) for heterogeneous reduction. In other embodiments, the metal precursor film may be thermally decomposed to the elemental metal using a heat source (e.g., a hotplate) in an apparatus in which the atmosphere may be carefully controlled (e.g., a glove box or dry box). Such annealing/reducing processes and alternatives thereof are described in co-pending U.S. patent application Ser. Nos. 11/888,949, 12/175,450, and 12/131,002, respectively filed on Aug. 3, 2007, Jul. 17, 2008, and May 30, 2008, the relevant portions of which are incorporated by reference herein.

In some implementations, forming the capacitor electrode(s) may comprise depositing a semiconductor layer/component (e.g., an element pre-cursor ink comprising one or more [doped] Group IVA elements, such as silicon and/or germanium, a "III-V" material such as GaAs, and/or an organic or polymeric semiconductor) at a thickness of from 50 to 200 nm. Suitable liquid-phase Group IVA element precursor inks and methods for printing such inks are disclosed in U.S. Pat. No. 7,498,317 and in co-pending U.S. patent application Ser. Nos. 10/616,147 and 11/867,587, respectively filed Jul. 8, 2003 and Oct. 4, 2007, the relevant portions of each of which are incorporated herein by reference.

In some embodiments, the (semi)conductive layer may be formed by electro(less) plating processes. In these embodiments, a printed metal layer (e.g., Pd, Pt, Co, etc.) can serve as a seed layer for electroless deposition or electroplating of other metals (e.g., Ag, Cu, Ni, etc.) and/or forming a metal silicide if so desired. A conductive metal (e.g., bulk conductive metal) may be plated onto the metal seed layer and/or onto a metal silicide. The resulting structure can be subsequently annealed to improve the electrical contact between the silicide and the plated metal. A cleaning and/or surface roughening step may be applied to the dielectric layer, and/or the dielectric layer may be etched before printing the metal ink to improve the adhesion of the plated metal to the dielectric layer. Plating the conductive metal may comprise either electroless plating or electroplating. In these embodiments, the ink used to form the seed layer of metal may be a nanoparticle and/or compound-based metal in such as a $PdCl_2$-containing ink. In other embodiments, the seed layer may comprise metal nanoparticles comprising cobalt, nickel, platinum, palladium, titanium, tungsten or molybdenum. However, in preferred embodiments, the seed layer comprises palladium. The conductive metal may comprise Al, Ag, Au, Cu, Pd, Pt, Ni, Cr, Mo, W, Ru, Rh, and alloys and/or mixtures thereof. Optionally, the bulk conductive metal may be further annealed to improve one or more physical and/or electrical characteristics. Exemplary methods of printing metal via seed printing and plating are described in detail in U.S. patent application Ser. Nos. 12/175,450 and 12/243,880, respectively filed on Jul. 17, 2008 and Oct. 1, 2008, the relevant portions of which are incorporated herein by reference.

It is generally desirable to increase the frequency response of the capacitor (e.g., MOS capacitor circuit) used in a surveillance/identification device, and provide a low series resistance for the circuitry in the device. This enables high frequency operation (e.g., in the range of 125 KHz and above, including, for example, 8.2 MHz or 13.56 MHz). To achieve sufficiently low series resistance and/or increased frequency response, the material used to form the upper capacitor electrode can be recrystallized. The recrystallization process may improve the carrier mobility and/or dopant activation of the conductive layer/electrode. Mobilities approaching 10 $cm^2$/vs and higher may be required for low dissipation and/or effective high Q. Low dissipation generally requires low series resistance, preferably less than 5 ohms for the entire circuit, along with a large parallel resistance (generally provided by a low leakage dielectric) of at least $10^4$ ohms, preferably $\geq 10^5$ ohms, most preferably $>10^6$ ohms. Effective high Q provides low field and/or high read range operation in MHz range frequencies and higher. Preferred techniques for recrystallization are described in U.S. Pat. No. 7,286,053, the relevant portions of which are incorporated herein by reference.

Some embodiments may comprise forming the capacitor electrodes by printing a semiconductor layer, which may be lightly or heavily doped. Heavily doping, or alternatively, siliciding the semiconductor material may also increase the frequency response of the surveillance/identification tag MOS capacitor circuit, and thus decrease series resistance. A doped semiconductor layer may be formed by conventionally implanting a conventional semiconductor dopant, diffusing the dopant into the semiconductor material from a solid or vapor dopant source, by printing a doped semiconductor or semiconductor precursor such as a B- or P-containing (cyclo) silane (see, e.g., U.S. Pat. No. 7,498,317, and U.S. patent application Ser. No. 10/616,147, filed Jul. 8, 2003, the relevant portions of which are incorporated herein by reference), and/or by laser forward transfer of a doped semiconductor layer or dopant diffusion source layer.

In other embodiments, it may be desirable to provide a relatively low level of doping (a concentration of $<5 \times 10^{18}$ $cm^{-3}$ electrically active dopant atoms) in the bulk of the active semiconductor layer to control the CV slope of the surveillance/identification device, and also reduce the series resistance of the semiconductor component. This may result in higher Q and/or higher frequency operation (see, e.g., U.S. Pat. No. 7,286,053, the relevant portion of which is incorporated herein by reference).

v. Forming the Antenna and/or Inductor

Figure 5A:
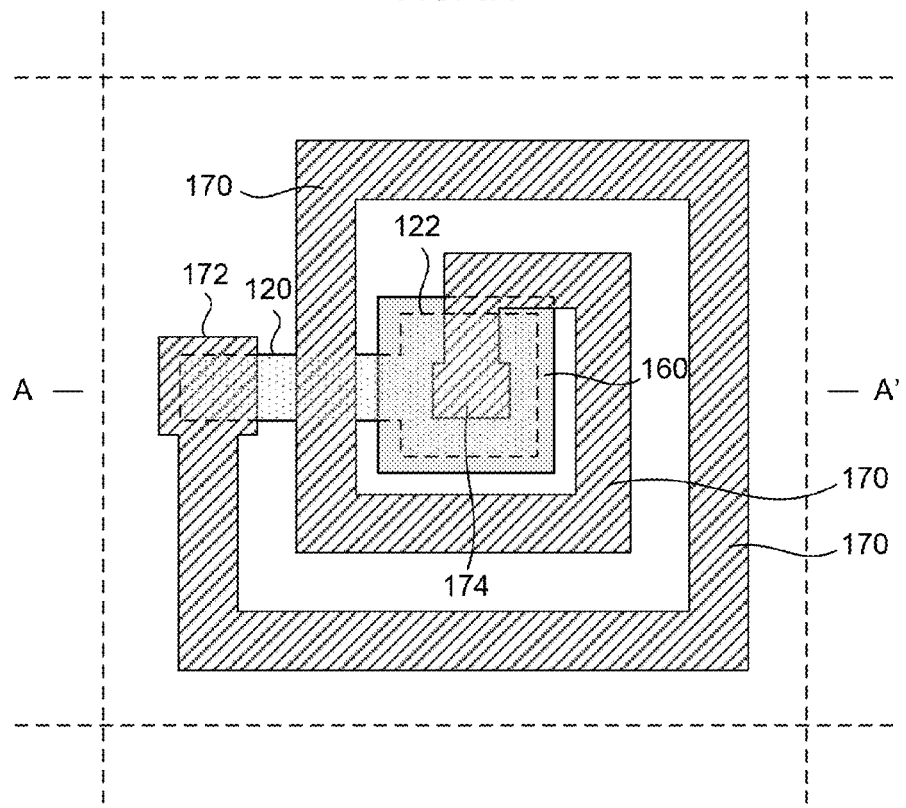
FIGS. 5A-5B show top-down and cross-sectional views, respectively, of an exemplary surveillance and/or identification device with capacitors connected in parallel, according to embodiments of the present invention.
Figure 5B:
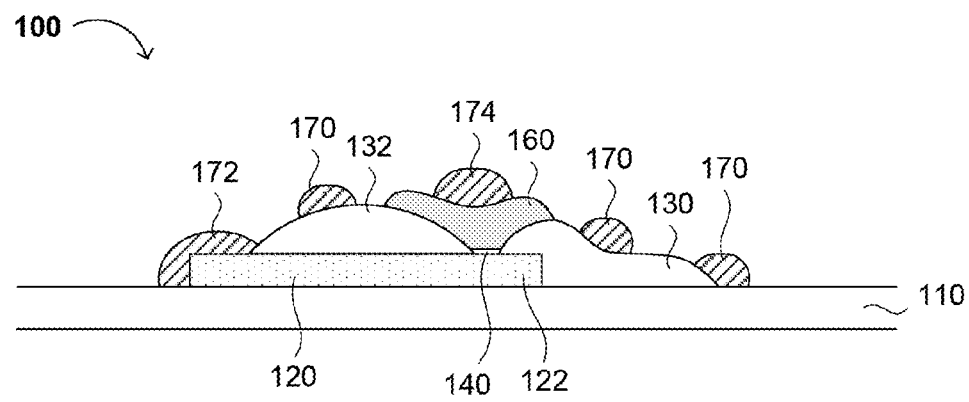

According to embodiments of the present method, an antenna and/or inductor may be formed on the structure and coupled with, or electrically connected to, the capacitors (e.g., lower capacitor electrode and/or upper capacitor electrode) and the electrically conducting strap to form the surveillance and/or identification tag or device. The antenna and/or inductor may comprise the antenna, the inductor, or both. In the first general method, as shown in FIGS. 5A-5B, the antenna and/or inductor 170 (which may include contact pad regions 172 and 174) is formed on, and is electrically connected to, the upper capacitor electrode 160 and the strap 120. FIG. 5B shows a cross-sectional view of the antenna formed on the upper capacitor electrode and strap along the A-A' axis of FIG. 5A. In exemplary embodiments, a first interconnect/contact pad 172 (an "outer contact pad" as shown in FIGS. 5A and 5B) is formed on the antenna/inductor to electrically contact the electrically conducting strap 120 where it is not covered by the first dielectric film 132. Similarly, a second interconnect/contact pad 174 (an "inner contact pad" as shown in FIGS. 5A and 5B) may also be formed on the antenna/inductor to electrically contact the upper capacitor electrode 160. In exemplary embodiments, the interconnect/contact pads 172/174 may comprise a metal bump or anisotropic conductive paste (ACP).

In general, the antenna/inductor may be formed using any of the methods described herein. The antenna/inductor may be formed with any shape and size suitable for placement on the tag or device, and can be made using any of the conductive materials described herein. For example, the antenna and/or inductor may be formed with a thickness of from 1 to 100 μm and a resistivity of from 0.1 to 100 μohm-cm (or any range of values therein), and the inductor/antenna may be formed with any shape and/or size that will fit on the tag/device (e.g., a coil or a spiral shape, etc.).

The antenna/inductor may be formed by blanket deposition, photolithographic masking, and etching processes, as are known in the art. In one embodiment, the metal/conductor for the antenna/inductor is printed or blanket-deposited onto a sheet, film or web of an insulative material, such as a polymer. If blanket-deposited onto a polymer sheet, photolithographic masking and etching provides a supported antenna that can be easily applied by roll-to-roll processing to the parallel capacitor structure of FIGS. 4A-B. The antenna 170-174 can then be electrically connected using various relatively inexpensive techniques and/or mechanisms, such as using conductive or non-conductive adhesives or ultrasonic or friction bonding between the antenna and the device. For example, in some embodiments, the antenna and/or inductor may be attached to the capacitors 122/160 and/or the electrically conducting strap 120 by applying a conducting or a non-conducting adhesive to the antenna/inductor (and/or to the upper capacitor electrode 160 and the strap 120), and then applying pressure to the antenna and/or inductor and the substrate to attach the antenna.

In some variations, the antenna/inductor may be formed on a second substrate, an applicator sheet, or other backing, and subsequently transferred or attached to the first substrate (e.g., the substrate having the capacitor electrodes and the strap thereon) using a conductive adhesive applied to the device and/or antenna/inductor. In alternate embodiments, the attachment process may include various physical bonding techniques, such as gluing, as well as establishing electrical interconnection(s) via wire bonding, anisotropic conductive epoxy bonding, ultrasonics, roll-to-roll attachment, bump-bonding or flip-chip approaches. This attachment process often involves the use of heat, time, friction or ultrasonic energy (e.g., between the contact pads of the inductor and the capacitor electrode), and/or UV exposure. Generally, temperatures of less than 200° C. (e.g., less than 150° C., such as 90-120° C.), or any other range of values less than 200° C. are utilized. The backing or second substrate having the antenna/inductor thereon is then placed face down on the device and sufficient pressure is applied to the backside of the second substrate to cause the antenna/inductor to adhere to the device without breaking structures in the device. The second substrate can remain or can be removed as desired. The antenna/inductor is then electrically connected between the first and second capacitors and the strap.

In preferred embodiments, the antenna and/or inductor 170-174 may be formed by printing (e.g., inkjet printing, gravure printing, screen printing, etc.) a metal or conductor ink using any of the printing processes described herein. The ink formulation may further be dried and/or cured (e.g., by annealing) to form the antenna/inductor 170-174. Suitable metal inks/precursor inks are described in detail herein. In some embodiments, the antenna and/or inductor 170-174 may be printed in a continuous pattern (e.g., a unitary structure) on the upper capacitor electrode 160 and the strap 120. However, the method is not limited as such. On the contrary, the antenna/inductor 170-174 may comprise a multi-coil structure (e.g., 2, 3, or more coils). Such multi-coil antennas/inductors and exemplary method(s) of making the same are described in detail in U.S. Pat. Nos. 7,152,804 and 7,286,053, the relevant portions of which are incorporated herein by reference.

In further embodiments, an additional support or backing layer may be added to a surface of the antenna/inductor 170-174 to provide additional mechanical support, stability, and/or protection to the device, particularly during subsequent processing steps. Such a backing layer may be added by lamination to paper or a flexible polymeric material (e.g., polyethylene, polypropylene, polyvinyl chloride, polytetrafluoroethylene, a polycarbonate, an electrically insulating polyimide, polystyrene, copolymers thereof, etc.) with the use of heat and/or an adhesive. Where the backing comprises an organic polymer, it is also possible to apply the backing layer from a liquid precursor by dip coating, extrusion coating or other thick film coating technology. In addition to providing mechanical support to the device, a support and/or backing layer may also provide an adhesive surface for subsequent attachment or placement of the surveillance/identification device onto an article to be tracked or monitored.

vi. Forming the Passivation Layer

Although not shown in FIGS. 3A-5B, in some embodiments, the present method(s) may further comprise forming a passivation layer over the structures on the substrate (e.g., the antenna/inductor, the capacitor electrodes, the electrically conducting strap, etc.). Forming a passivation layer may inhibit or prevent the ingress of water, oxygen, and/or other species that might cause degradation or failure of the integrated circuitry/device. Suitable materials for forming the passivation layer, as well as exemplary characteristics (e.g., length, width, thickness, etc.) are described in detail with regard to exemplary devices with multiple capacitors (see, e.g., the section(s) entitled, "The Passivation Layer" herein).

The passivation layer may be formed by coating the upper surface of the structure with one or more inorganic barrier layers such as a polysiloxane and/or a nitride, oxide and/or oxynitride of silicon and/or aluminum, and/or one or more organic barrier layers such as parylene, a fluorinated organic polymer or other barrier material known in the art. In some variations, the passivation layer may comprise an underlying dielectric layer, which may be formed using any of the methods described herein. The underlying dielectric layer may be formed from a material having lower stress than that of the overlying passivation layer. To illustrate, the underlying dielectric layer may comprise an oxide (e.g., $SiO_2$, TEOS, undoped silicate glass [USG], fluorosilicate glass [FSG], borophosphosilicate glass [BPSG], etc.), and the passivation layer may comprise silicon nitride or a silicon oxynitride. In some embodiments, the passivation layer may have a thickness that is slightly greater than the thickness of the dielectric layer(s) separating various active components of the circuit (e.g., dielectric layer 130/132).

A Second Exemplary Method for Making Devices with Parallel Capacitors

Figure 6A:
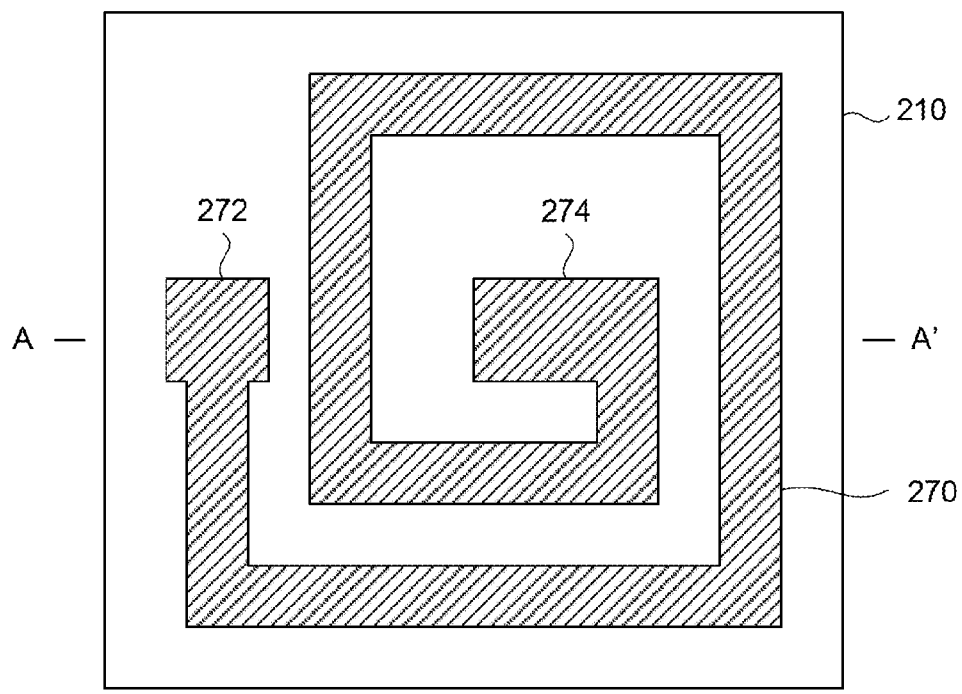
FIGS. 6A-6B show top-down and cross-sectional views, respectively, of an exemplary intermediate in a second exemplary method for making a surveillance and/or identification device with capacitors connected in parallel, according to embodiments of the present invention.

A second general method for making a surveillance and/or identification device with capacitors connected in parallel is discussed herein with regard to FIGS. 6A-9B. FIGS. 6A and 6B show top-down and cross-sectional views, respectively, of a substrate 210 having an antenna and/or inductor 270 formed thereon. Specifically, FIG. 6B shows a cross-sectional view of FIG. 6A along the A-A' axis. As with the first exemplary method, the second exemplary method for making devices with parallel capacitors may also include a conductive substrate, a semiconductive substrate, or an insulating substrate. However, in various embodiments, insulating substrates are preferred. In some implementations including a conductive substrate, the substrate may have one or more insulating layers thereon, as described herein and as shown in FIG. 3C.

i. Forming the Antenna and/or Inductor

Figure 6B:
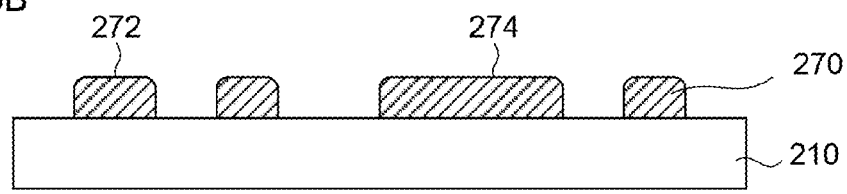

As shown in FIGS. 6A-B, in the second exemplary method, an antenna and/or inductor 270 is formed on the substrate 210. The antenna/inductor may include any conducting material(s) described herein and be formed according to any of the methods disclosed herein for forming a patterned layer or feature. In exemplary embodiments, an interconnect pad and/or contact pad 272 may be formed at one end of the antenna/inductor 270 to provide an interconnection site for a subsequently formed electrically conducting strap (e.g., structure 220 of FIG. 9A) to electrically connect the inductor/antenna 270 to the upper capacitor electrode (e.g., structure 260 of FIG. 9A). In addition, a second interconnect pad and/or contact pad 274 may also be formed at one end of the antenna to electrically contact a subsequently formed lower capacitor electrode (structure 250 of FIG. 7B).

Although not shown in FIGS. 6A-9B, in some variations, the second interconnect/contact pad 274 may also serve as the lower capacitor electrode. In such embodiments, the antenna does not have to be formed (e.g., by printing) on the substrate. On the contrary, in some embodiments, the substrate comprises a conductive substrate, and after the other structures (e.g., dielectric films, capacitor electrodes, an electrically conducting strap, etc.) are formed on the substrate, the antenna and the contact pads (including the contact pad/lower capacitor electrode 274) can be patterned and etched from the conductive substrate. Exemplary methods for forming the antenna from an electrically conducting substrate are described in detail in U.S. Pat. Nos. 7,152,804 and 7,286,053.

ii. Forming the Interlayer Dielectric Film

Figure 6C:
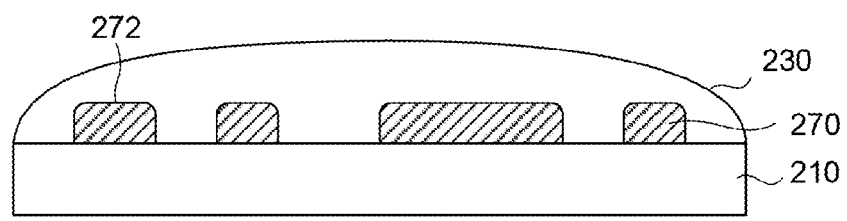
FIG. 6C shows a cross-sectional view of the device of FIG. 6B with a first dielectric film formed thereon.
Figure 6D:
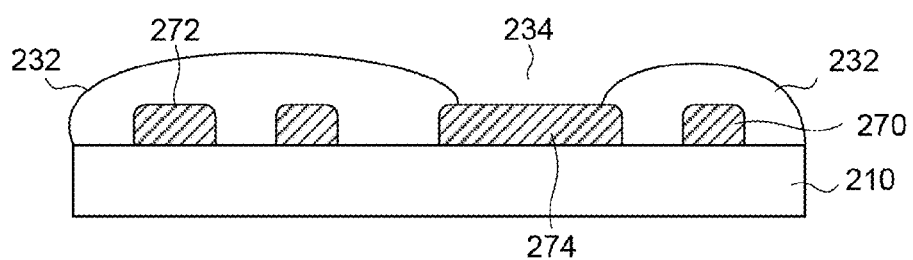
FIG. 6D shows a cross-sectional view of the device of FIG. 6C with a contact hole formed in the first dielectric film.

Referring now to FIG. 6C, an interlayer dielectric film 230 (ILD) may be formed on the antenna/inductor 270 and the substrate 210. At least one contact hole 234 is formed in the dielectric film as shown in FIG. 6D (e.g., over contact pad 274) to facilitate electrical connection with the first and second parallel capacitors that will be subsequently formed. The resulting ILD pattern 232 is shown in FIG. 6D. In embodiments where the connection pad 274 serves as the lower capacitor electrode, the contact hole or opening in the dielectric film (e.g., structure 234 of FIG. 6D) may be relatively small. The dielectric film 230/232 and the contact hole 234 may be formed using any of the techniques described herein for forming interlayer dielectrics (e.g., dielectric layer 130/132 in FIGS. 3B-5B) and openings (e.g., the space between dielectric layer portions 130 and 132 in FIGS. 3B-5B in which capacitor dielectric layer 140 is formed). For example, the dielectric layer 230 may be blanket deposited or coated over the entire structure as shown in FIG. 6C, using any of the techniques described herein. The dielectric film 230 may then be subsequently etched to form contact hole 234 exposing the contact pad 274, as shown in FIG. 6D. Alternatively, in exemplary implementations, the dielectric layer 232 may be selectively printed onto the structure shown in FIG. 6B in a predetermined pattern to include the contact hole 234 therein.

iii. Forming the Lower Capacitor Electrode

FIG. 7A shows a top-down view of a lower capacitor electrode 250 formed on the substrate. FIG. 7B shows a cross-sectional view of FIG. 7A along the A-A' axis. In general, the lower capacitor electrode 250 is formed in the contact hole (e.g., structure 234 of FIG. 6D), on the connection or interconnect pad 274 of the antenna/inductor 270. The lower capacitor electrode 250 may also be formed on portions of the interlayer dielectric film 232 adjacent to pad 274. The lower electrode may include any of the conductive materials described herein and be formed using any of the techniques described herein for forming conductive materials. In variations in which the contact pad 274 of the antenna serves as the lower capacitor electrode, the step of forming the lower capacitor electrode may be eliminated or combined with the step of forming the antenna.

Embodiments where the contact pad 274 serves as the lower capacitor electrode may be advantageous because this method eliminates a printing step (e.g., to separately form the lower capacitor electrode) and generally results in a thinner device or tag. On the other hand, embodiments where the lower capacitor electrode 270 is formed on the antenna/contact pad 274 may be advantageous because forming the lower capacitor electrode in a separate step provides greater control over the size, shape, and characteristics of the electrode, and thus over the capacitance ratio of C1 to C2 (see FIG. 1). For example, when the lower capacitor electrode is printed, it can have a greater area relative to the area of the contact pad 274. In addition, the lower capacitor electrode can be formed (e.g., by printing) using a different material than that used to form the antenna/contact pad 274. This allows greater flexibility with regard to the characteristics of the capacitor, and allows a tag or device to be customized for a particular purpose.

iv. Forming the Capacitor Dielectric Film Layers

Referring now to FIGS. 7C and 7D, a relatively thin dielectric film 240 is formed on at least part of the lower capacitor electrode 250, and a relatively thick dielectric film 280 is formed on the thin dielectric film 240 and portions of the interlayer dielectric film 232. As shown in FIG. 7D, the thick dielectric film 280 has at least one hole formed therein to expose a portion of the underlying thin dielectric film 240. The thin dielectric film 240 may be formed using any of the growth or deposition techniques described herein (e.g., thermal or chemical oxidation and/or nitridization, blanket deposition, coating, printing, etc.). The thick dielectric film 280 and the contact hole therein may be formed by blanket depositing a dielectric material and then etching the dielectric to form the contact hole exposing the thin dielectric film 240. In other embodiments, the thick dielectric film 280 is formed by selectively printing the dielectric material (e.g., printing a dielectric precursor ink in a predetermined pattern and curing, etc.) so that the contact hole is formed therein. In one embodiment, the thin dielectric film 240 is grown on the lower electrode 250 (e.g., by thermal or chemical oxidation, anodization, etc.), and the thick dielectric film 280 is deposited on the structure (e.g., by coating, blanket deposition, printing, etc.). Suitable dielectric materials are discussed in detail herein.

v. Forming the Upper Capacitor Electrode

Figure 8A:
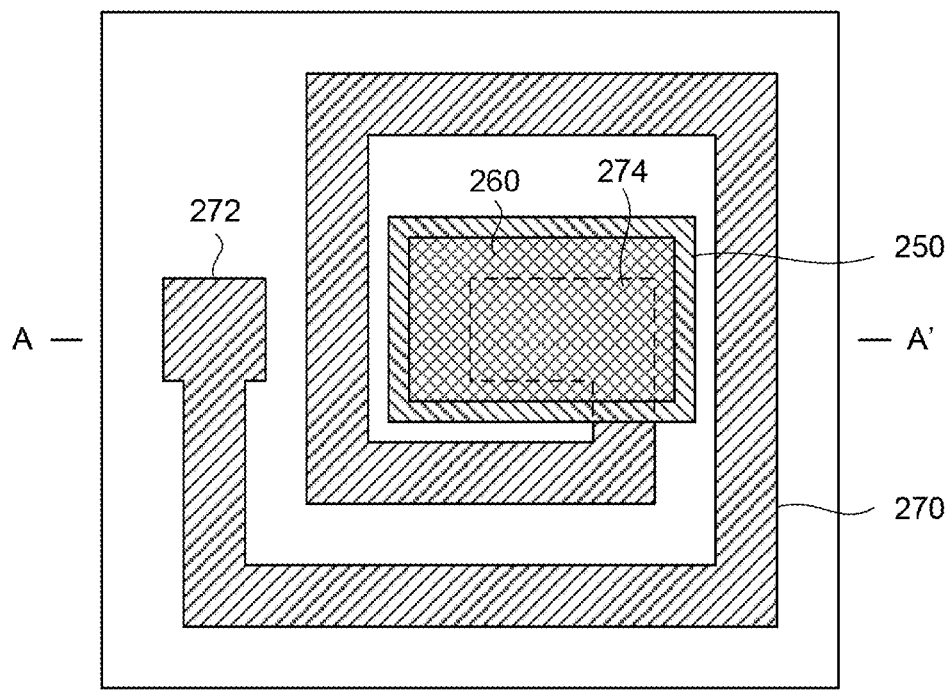
FIGS. 8A-8B show top-down and cross-sectional views, respectively, of another exemplary intermediate in the second exemplary method for making a surveillance and/or identification device with capacitors connected in parallel, according to embodiments of the present invention.
Figure 8B:
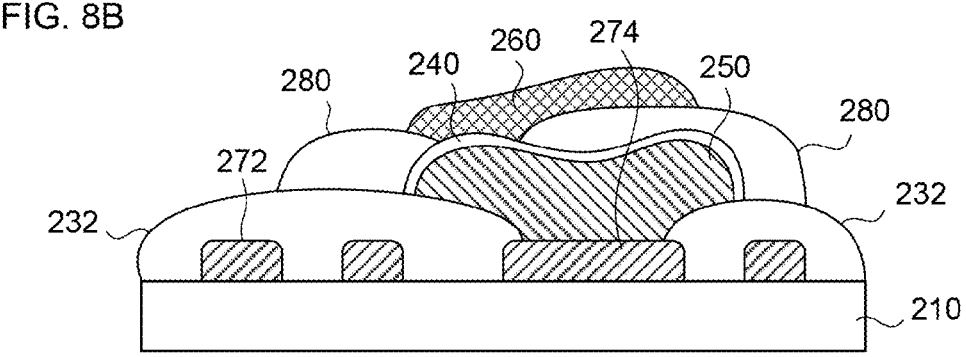

FIG. 8A shows a top-down view of an upper capacitor electrode 260 formed on or over the thin and thick capacitor dielectric films 240 and 280, respectively. FIG. 8B shows a cross-sectional view of FIG. 8A along the A-A' axis. In general, the upper capacitor electrode 260 may be formed by printing or any other technique described herein for forming conductive structures. The upper capacitor electrode 260 is capacitively coupled to the lower capacitor electrode 250 through thin dielectric film 240 and thick dielectric film 280, thereby forming first and second capacitors C1 and C2, connected in parallel. In general, the second capacitor includes the thick capacitor dielectric film 280, and has greater capacitance than the first capacitor (defined by the opening in the thick capacitor dielectric film 280 and/or the capacitive coupling through only the thin dielectric film 240).

In preferred embodiments, the thin dielectric film 240 is formed such that its thickness is from 20 to 1,000 Å, or any range of values therein. In contrast, the thick dielectric film 280 preferably is formed such that its thickness is from 2,000 to 20,000 Å, or any range of values therein. In certain implementations, the thick dielectric film 280 may have a thickness in the range of 3,000 to 5,000 Å. Furthermore, the opening in the thick dielectric film 280 formed over the lower capacitor electrode 250 is formed with dimensions that are not greater than 20% of the area between the upper and lower capacitor electrodes containing the thick dielectric film 280. Preferably, the opening is not greater than 5% of the area between the upper and lower capacitor electrodes 250/260, although any percentage between 5% and 20% may be acceptable in various embodiments.

The relatively thin capacitor dielectric 240 is preferably designed and fabricated such that application of a deactivating radio frequency electromagnetic field induces a voltage differential in the capacitor across the dielectric layer that will deactivate the tag/device. In many embodiments, a voltage differential of about 4 to about 50 V, preferably about 5 to less than 30 V, more preferably about 4 to 15 V or any desired range of endpoints therein, is sufficient to cause breakdown of the dielectric layer to a shorted state (or to change the capacitance such that the tag circuit no longer resonates at the desired frequency). Thus, in exemplary embodiments, the relatively thin capacitor dielectric film 240 is formed with (i) a thickness of from 50 to 400 Å and/or (ii) a breakdown voltage of from about 4 to about 15 V (depending on Q, the dielectric film thickness, etc.).

vi. Forming the Electrically Conducting Strap

Figure 8C:
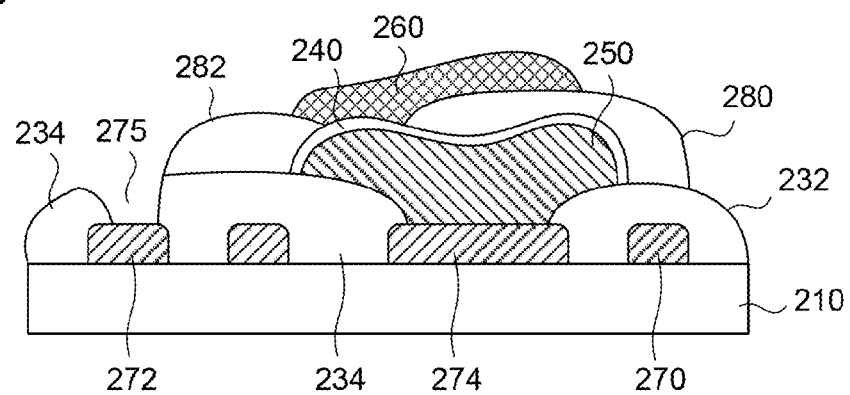
FIG. 8C shows a cross-sectional view of the device of FIG. 8B with a contact hole formed in the first dielectric layer exposing a portion of the antenna and/or inductor.

As shown in FIG. 8C, a contact hole 275 is formed in the interlayer dielectric film 232 (e.g., by photolithographic masking and etching, by selective placement of one or more drops of wet etchant using a microsyringe, etc.) to expose the second interconnection/contact pad 272 of the antenna/inductor 270 such that portions of the dielectric material cover and/or remain on the antenna 270/272 and/or substrate 210 (see, e.g., dielectric film 234 of FIG. 8C). The resulting dielectric pattern is shown in cross-section as structures 234 and 232 in FIG. 8C.

Figure 9A:
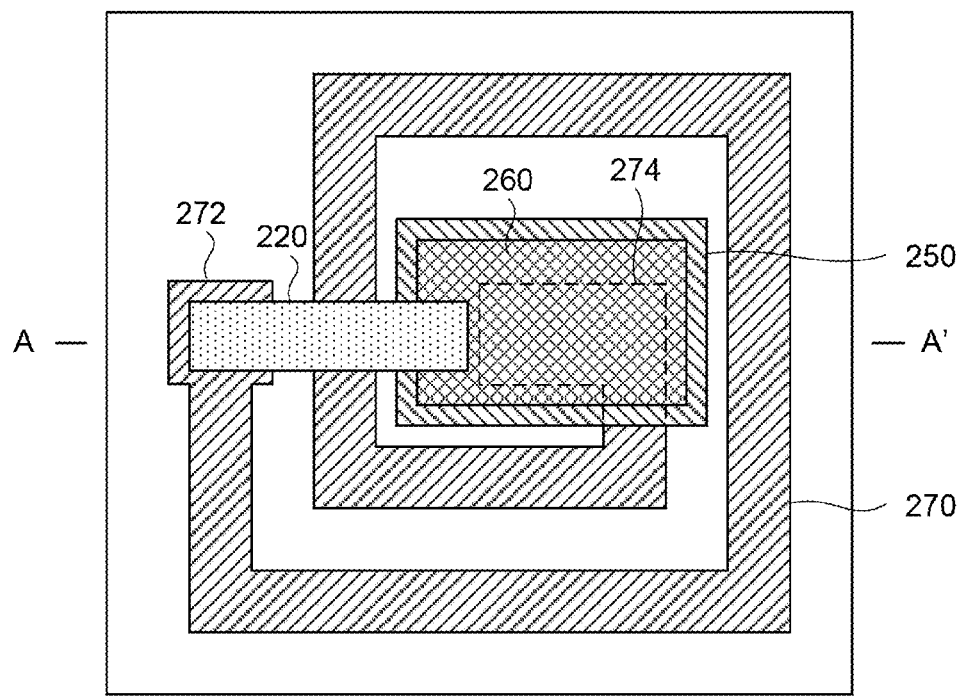
FIGS. 9A-9B show top-down and cross-sectional views, respectively, of a second exemplary surveillance and/or identification device with capacitors connected in parallel, according to embodiments of the present invention.
Figure 9B:
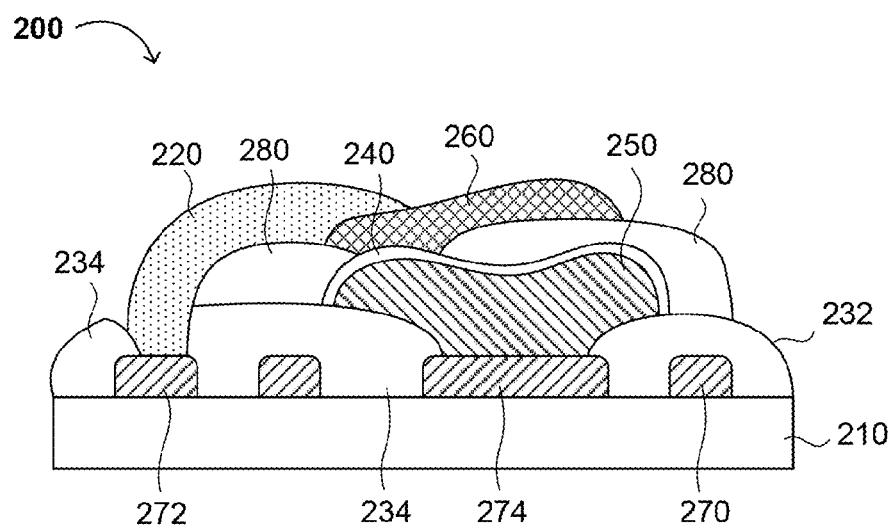

As shown in FIG. 9A, an electrically conducting strap 220 is formed on the device to provide electrical communication between the capacitors (e.g., upper electrode 260) and the exposed interconnect/contact pad 272 of the antenna/inductor 270. FIG. 9B shows a cross-sectional view of FIG. 9A along the A-A' axis. The electrically conducting strap 220 can be formed using any of the techniques described herein for forming electrically conductive features. In embodiments where the interconnect pad 274 serves as the lower capacitor electrode and the contact hole in the interlayer dielectric film 232 formed by masking and etching, the electrically conducting strap 220 can be formed at the same time as the upper capacitor electrode 260.

vii. Forming the Passivation Layer

Although not shown in FIGS. 6A-9B, as with the first exemplary method, in some variations, the second exemplary method may further comprise forming a passivation layer over the structures on the substrate as described herein (e.g., the capacitor electrodes, the capacitor dielectric layers, the electrically conducting strap, etc.).

A Third Exemplary Method for Making Devices with Parallel Capacitors

Figure 10A:
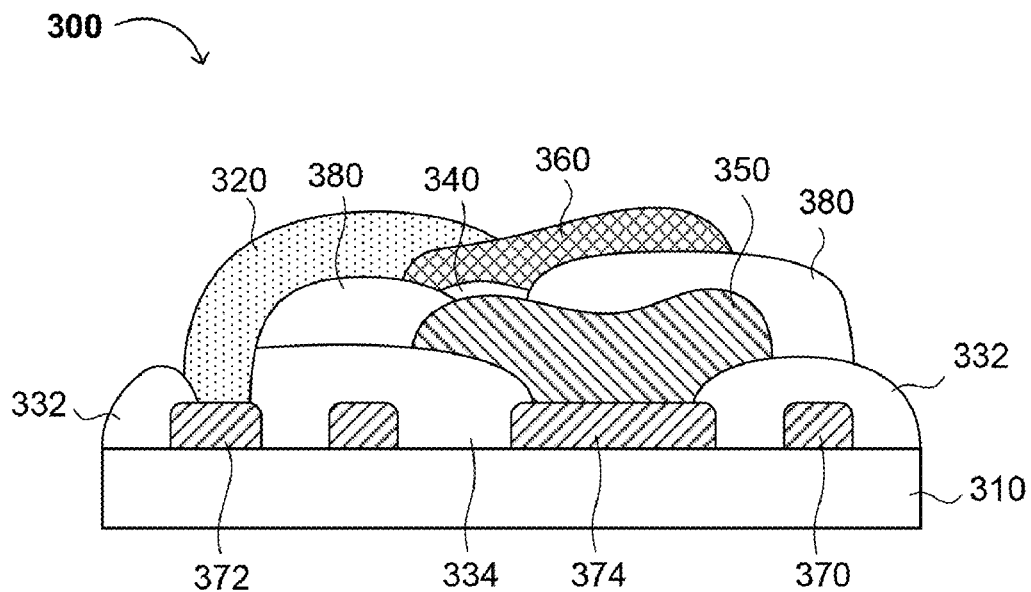
FIGS. 10A-10B show cross-sectional views of exemplary surveillance and/or identification devices with capacitors connected in parallel, according to embodiments of the present invention.
Figure 10B:
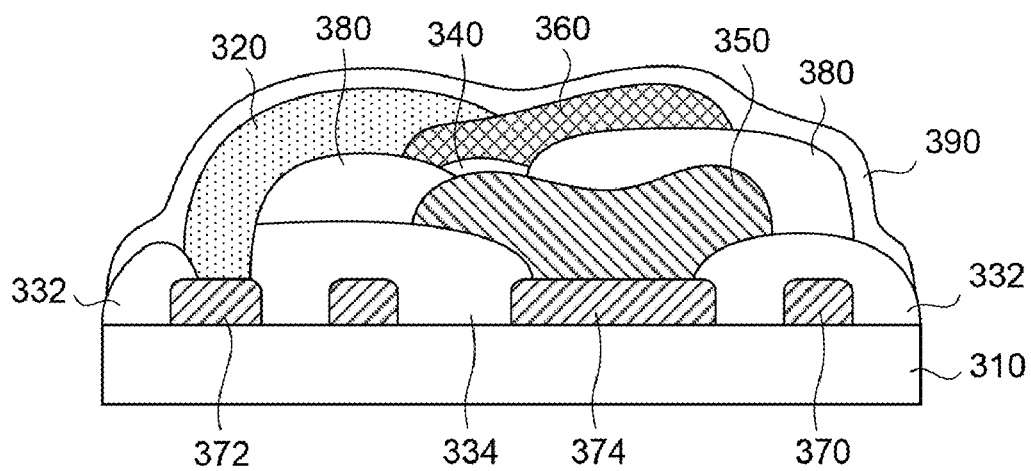

A third exemplary method for making a device with parallel capacitors is shown in FIGS. 10A and 10B. This embodiment is substantially similar to the method shown in FIGS. 6A-9B, with slight modifications, primarily to the step(s) for forming the relatively thin capacitor dielectric film (e.g., structure 340) and the step(s) for forming the strap. Thus, in the third exemplary method, the antenna/inductor 310, the interlayer dielectric layer 332, and the lower capacitor electrode 350 are formed on the substrate using any of the methods as described herein.

i. Forming the Relatively Thick and Relatively Thin Dielectric Layers

As shown in FIG. 10A, in exemplary embodiments, a relatively thick dielectric film 380 is formed on the interlayer dielectric film 332 and on portions of the lower capacitor electrode 350. A hole or opening is formed in the relatively thick dielectric film 380 to expose a portion of the lower capacitor electrode 350, either by printing a patterned dielectric film 380 that includes the opening or by forming the opening by photolithography and etching. Next, a relatively thin dielectric film 340 is selectively formed (e.g., by thermal growth) on the lower capacitor electrode 350 only in the opening in the thick dielectric layer 380. Then, an upper capacitor electrode 360 is formed on the relatively thick dielectric film 380 and the relatively thin dielectric film 340, as described herein.

ii. Forming the Device

Referring again to FIG. 10A, the opening in the dielectric layer 332/334 over antenna pad 372 and the electrically conducting strap 320 are formed in the same manner as described for the embodiment(s) shown in FIGS. 8C and 9A-B. Alternatively, the strap 320 may be formed on an applicator sheet or other backing (e.g., by blanket deposition and photolithographic masking/etching, cutting, or any printing process discussed herein), and subsequently transferred and/or attached to the tag circuit (e.g., by a roll-to-roll attachment process, a pick-and-place operation, etc.). In these embodiments, the attachment process may include various physical bonding techniques, such as gluing, as well as establishing electrical interconnection(s) via anisotropic conductive epoxy bonding, ultrasonics, bump-bonding or flip-chip approaches. This attachment process may involve the use of heat, time, friction or ultrasonic energy (e.g., between the contact pads of the inductor and the capacitor electrode), and/or UV exposure. Generally, temperatures of less than 200° C. (e.g., less than 150° C., 90-120° C., or any other range of values less than 200° C.) are utilized. The electrically conducting strap is placed face down on the device, and sufficient pressure is applied to the backside of the substrate 310 to cause the strap to adhere to the device. The backing layer 390 can remain or can be removed as desired. The strap is then electrically connected between the first and second capacitors (e.g., C1 and C2 of FIG. 1) and the antenna/inductor (e.g., at contact pad 372).

Exemplary Methods for Making Devices with Series Capacitors

Embodiments of the present invention concern methods of making a surveillance and/or identification device with capacitors connected in series. An exemplary embodiment is described with reference to FIGS. 11 and 12. Specifically, FIG. 12 shows a top-down view of an exemplary device with capacitors connected in series, and FIG. 11 shows a cross-sectional view of the device along the A-A' axis of FIG. 12.

i. Preparing the Substrate

Figure 11:
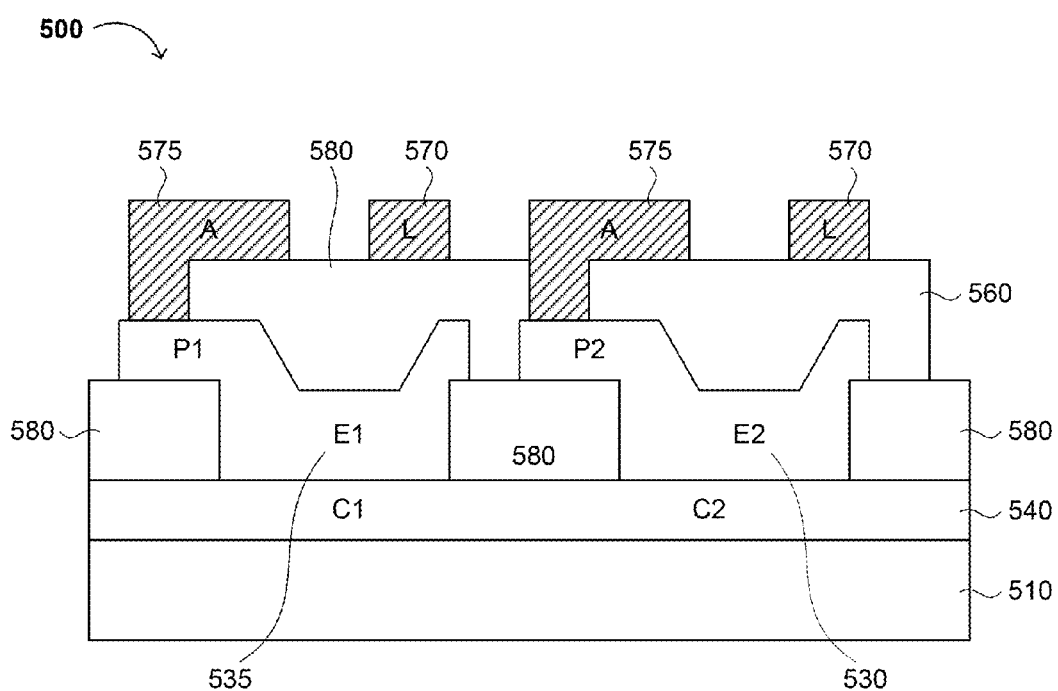
FIG. 11 shows a cross-sectional view of an exemplary surveillance and/or identification device with capacitors connected in series, according to embodiments of the present invention.
Figure 12:
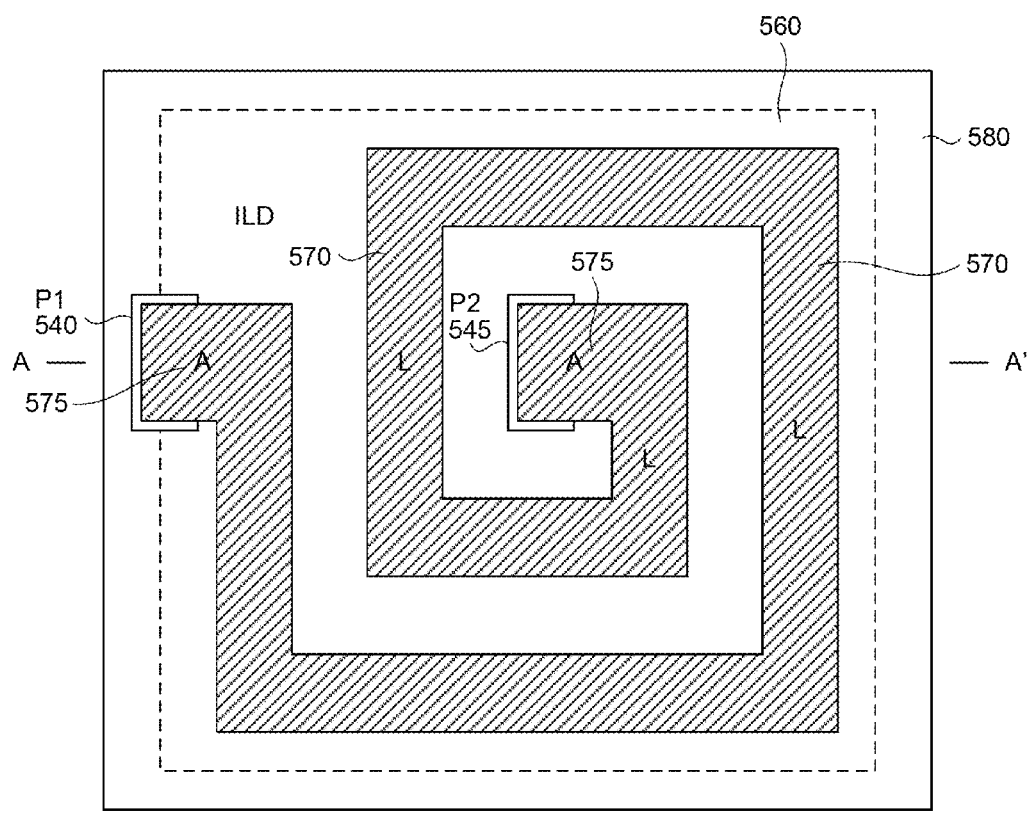
FIG. 12 shows a top-down view of the surveillance and/or identification device of FIG. 11.

As shown in FIG. 11, a first dielectric film or layer 540 is formed over a substrate 510. Although the substrate may comprise any material described herein, the substrate 510 preferably comprises an electrically conductive substrate (e.g., a metal sheet or foil) as described in detail herein. For example, in various embodiments, the metal of the substrate may comprise aluminum, titanium, copper, silver, chromium, molybdenum, tungsten, nickel, gold, palladium, platinum, zinc, iron, steel (e.g., stainless steel) or any alloy thereof In such implementations, the metal for the conductive substrate may be chosen at least in part based on its ability to be anodized to form an effective capacitor dielectric. In exemplary embodiments, the substrate may have a nominal thickness of from 5-200 μm (preferably 20-100 μm in those embodiments in which a high Q is advantageous) and/or a resistivity of 0.1-100 μohm-cm (preferably 0.5-80 μohm-cm). Additionally, prior to subsequent processing, the conductive substrate may be conventionally cleaned and/or smoothed as described herein.

In preferred implementations, the capacitors in series share the conductive substrate (e.g., metal sheet or metal foil) as a common lower capacitor electrode. However, in one alternate embodiment (not shown in FIGS. 11-12), the lower capacitor electrodes may be formed on a non-conductive substrate, and the first dielectric film 540 can be formed on the lower capacitor electrodes using any of the methods described herein. However, in this alternate embodiment, a conductive interconnection is also formed between the lower capacitor electrodes.

ii. Forming the First Dielectric Film Layer

Referring again to FIG. 11, a first dielectric film or layer 540 is formed over the (conductive) substrate 510. In general, the capacitors in series share the first dielectric film as a capacitor dielectric. In exemplary embodiments, the first dielectric film 540 is formed by oxidizing and/or nitriding the conductive substrate (e.g., by anodizing the conductive substrate 510 or by depositing a liquid oxide/nitride precursor on the conductive substrate 510 and curing the precursor) as described herein. However, in alternate embodiments, the first dielectric film 540 may be formed by printing, or by blanket depositing or coating, then photolithography and etching, as described herein. Although not shown in FIG. 11, in some variations, the dielectric layer 540 may optionally be selectively deposited or etched to expose one or more regions of the conductive substrate 510.

iii. Forming the Upper Capacitor Electrodes

Referring still to FIG. 11, a plurality of capacitor electrodes (e.g., E1 and E2, structures 535 and 530, respectively) are formed on the first dielectric film 540. In general, the upper capacitor electrodes 530/535 may be formed by depositing a conductive material (e.g., a metal or other conductive ink, semiconductor ink, etc.) in the contact holes or openings in the relatively thick dielectric film 580 using any method described herein. In preferred embodiments, and as shown in FIG. 11, the capacitor electrodes are capacitively coupled to the conductive substrate, and are physically isolated from each other. In exemplary embodiments, the capacitor electrodes 530/535 are formed in and/or by the same fabrication process, and may be formed such that the thickness is from 30 nm to 5,000 nm, or any range of values therein.

iv. Forming the Relatively Thick Dielectric Film

In exemplary variations, a relatively thick dielectric film 580 may optionally be formed on the first dielectric film 540 before forming the capacitor electrodes 530/535 using any of the techniques described herein (e.g., blanket depositing or coating, selective printing, etc.). In general, the relatively thick dielectric film 580 has a greater thickness than the first dielectric film 540, and has a plurality of contact holes or openings formed therein for the capacitor electrodes 530/535. If the relatively thick dielectric film 580 is sufficiently thick, the extra capacitance between the portions of the upper capacitor electrodes (e.g., P1 and P2) and the substrate 510 can be kept well below the C1 and C2 capacitances. In some embodiments, the capacitor electrodes (e.g., E1 and E2) can be selectively printed directly on the dielectric film C1/C2 prior to (or without) forming the relatively thick dielectric film 580. However, formation of the relatively thick dielectric film 580 prior to formation of the capacitor electrodes 530/535 is preferred. In exemplary embodiments, the electrodes are formed with contact pads P1 and P2 on a portion of the relatively thick dielectric film 580, for connection to the subsequently formed inductor and/or antenna.

v. Forming an Interlayer Dielectric Film

As shown in FIG. 11, in exemplary embodiments, a second dielectric film (e.g., an interlayer dielectric film [ILD]) 560 is deposited and/or patterned over the upper capacitor electrodes 530/535 and the relatively thick dielectric film 580 such that contact holes or connection openings are formed over the contact pads P1 and P2 of the upper capacitor electrodes 530/535. The ILD 560 and contact holes therein may be formed using any of the methods described herein for forming relatively thick dielectric layers (e.g., coating and photolithographic etching, selective printing, etc.). Forming the ILD 560 permits assembly of the device onto an antenna and/or inductor with electrical contacts at the contact pads P1 and P2, without requiring any direct electrical connection to the conductive substrate 510. In general, the ILD 560 is formed with a greater thickness than the first dielectric film 540. When the ILD 560 is formed (e.g., by printing, etc.), the thickness of the ILD 560 near the exposed portions of the contact pads P1 and P2 can be relatively small. This may further facilitate attachment of the antenna.

vi. Forming the Antenna and/or Inductor

As shown in FIGS. 11 and 12, an antenna and/or inductor 570 is formed on the device and is electrically connected to each of the capacitor electrodes (e.g., via structures 575 connected at P1 and P2). The antenna/inductor 570/575 may be formed on or over portions of the ILD 560 and the upper capacitor electrodes 530/535 using any of the methods and/or materials described herein. It should be noted that many other embodiments and/or variations may be apparent to one of skill in the art from the present disclosure. Thus, the present invention is not limited to the embodiments described herein. For example, the sequence of steps to form the circuit structures may be reversed, the circuit elements may be formed laterally, etc., rather than using the order of steps disclosed in the exemplary embodiments above.

Exemplary Surveillance and/or Identification Devices with Multiple Capacitors

As previously discussed with regard to exemplary methods of making devices, the surveillance/identification devices of the present invention may have a plurality of capacitors connected in parallel (see, e.g., the circuit diagram of FIG. 1) and/or the devices may have a plurality of capacitors connected in series (see, e.g., the circuit diagram of FIG. 2). Exemplary embodiments and variations of such devices are discussed below.

A First Exemplary Surveillance and/or Identification Device with Parallel Capacitors A first exemplary surveillance and/or identification tag 100 with capacitors connected in parallel is shown in FIGS. 5A and 5B (top-down and cross-sectional views, respectively).

i. The Substrate

In this embodiment, a surveillance and/or identification device 100 comprises an electrically conducting strap or feature 120 on a substrate 110. In general, the substrate 110 may comprise any suitable insulating, conductive, or semiconductive material known in the art. For example, the substrate may comprise a wafer, plate, disc, sheet and/or foil of a semiconductor (e.g. silicon), a glass, a ceramic, a dielectric, plastic and/or a metal, preferably a member selected from the group consisting of a silicon wafer, a glass plate, a ceramic plate or disc, a plastic sheet or disc, metal foil, a metal sheet or disc, and laminated or layered combinations thereof. Although suitable substrates for this embodiment include conductive and semiconductive substrates, in preferred embodiments, the substrate comprises an insulating material (e.g., a plastic sheet or web, etc.).

In some variations, the substrate may further include one or more dielectric, buffer, planarization, passivation, insulating and/or mechanical support layers (such as a polyimide or other polymer, silicon and/or aluminum oxide, etc.) thereon. Such layers may themselves be patterned and/or have patterned semiconductor, conductor and/or dielectric features thereon. In some implementations, plastic and metal substrates may further contain a planarization layer thereon to reduce the surface roughness of the substrate. In addition, the electrically conductive substrates (e.g., comprising or consisting essentially of a metal) generally have an insulator layer (e.g., a layer of the corresponding metal oxide) and/or a substantially amorphous conductive layer (e.g., a transition metal nitride, such as titanium nitride, tantalum nitride, or tungsten nitride) thereon.

In further embodiments, the substrate may be part of the device circuit, and thus may include a conductive material therein (see, e.g., FIG. 3C). As shown in FIG. 3C, the substrate 110 may comprise a multi-layer structure, including a metal or other conductive material 102 with a corresponding oxide or blanket deposited/coated insulator 104a thereon. Optionally, the substrate may comprising a backing layer 104b on the metal layer 102, which may comprise the same material as the insulating layer 104a. In preferred embodiments, the metal layer 102 comprises aluminum or stainless steel foil with $SiO_2$ deposited or coated thereon (e.g., layer 104a on layer 102). In other embodiments, the metal layer 102 may comprise aluminum foil with anodized $Al_2O_3$ thereon (e.g., layers 104a and 104b).

ii. The Electrically Conducting Strap

Exemplary surveillance/identification devices with parallel capacitors further comprise an electrically conducting strap or other electrically conducting feature, which provides electrical communication between the capacitors and the inductor/antenna of the device. As shown in FIG. 5B, in some preferred embodiments, the strap 120 is formed on the substrate 110, and the capacitors in parallel share the electrically conducting strap as the lower capacitor electrode (e.g., as shown by identification number 122 in FIGS. 5A and 5B). As further shown in the embodiment of FIGS. 5A/5B, the electrically conducting strap 120 may be electrically connected to the lower capacitor electrode 122 and the inductor/antenna 170 (e.g., at connection pad 172). In some variations, the strap 120 and lower capacitor electrode 122 may be a unitary structure (e.g., made in the same processing step, for example by printing, or in a sequence of steps, for example by sputtering and photolithography), and may have the same metal (or other conductive material) throughout the structure.

In general, the strap 120 may comprise any electrically conductive material. For example, in some implementations, the strap may comprise a metal such as aluminum, titanium, copper, silver, chromium, molybdenum, tungsten, nickel, gold, palladium, platinum, zinc, iron, or an alloy thereof, such as stainless steel, TiW alloy, NiCr alloy, etc. In exemplary embodiments, the strap consists essentially of silver, gold, copper, or aluminum (or a conductive alloy thereof). In various embodiments, the strap may comprise the same material as the inductor and/or the upper and/or lower capacitor electrodes. However, the device is not limited as such. Thus, in alternate embodiments, the strap, the inductor, and the capacitor electrodes may each comprise a different material. In some implementations, dopants, siliciding components, or other work function modulation agents and/or tunneling barrier materials may be included in the electrically conducting strap. Such inclusion may reduce the series resistance, increase the Q, and improve the overall performance of the surveillance and/or identification device.

The strap 120 may have any suitable size and shape (e.g., square, rectangular, round, etc.) that will allow for placement on the device or tag. In various embodiments, the strap may have a thickness ranging from 30 nm to 5,000 nm, preferably from 50 nm to 2,000 nm, and more preferably from 80 nm to 500 nm (or any other range of values therein).

iii. Exemplary Dielectric Film Layers

The device shown in FIG. 5B comprises a first dielectric film 130 on the substrate 110, and also on or over a portion of the electrically conducting strap 120 (see, e.g., structure 132 of FIG. 5B). In such embodiments, the first dielectric film 130/132 exposes a portion of the strap 120 and has an opening over a portion of the lower capacitor electrode 122. In addition, the embodiment of FIG. 5B further comprises a capacitor dielectric film 140 on the lower capacitor electrode 122 in the opening in the first dielectric film 130/132. In general, the first dielectric film 130/132 is unitary, and completely covers strap 120 and lower capacitor electrode 122, except for (i) the end portion of strap 120 that forms an electrical connection or ohmic contact with pad 172 of antenna/inductor coil 170 and (ii) the relatively small, generally circular or square opening in the first dielectric film 130/132 in which thin dielectric film 140 is formed.

In the embodiment of FIG. 5B (and variations thereof), the capacitor dielectric 140 has significantly smaller thickness than the thickness of the first dielectric film 130. For example, the capacitor dielectric film 140 preferably has a thickness of from 20 to 1,000 Å. In contrast, the first dielectric film 130/132 preferably has a thickness of from 2,000 to 20,000 Å. In exemplary embodiments, the first dielectric film 130/132 has a thickness of from 3,000 to 5,000 Å. In general, the opening in the first dielectric film 130/132 over the lower capacitor 122 is not greater than 20% of the area between the upper and lower capacitor electrodes containing the first dielectric film 130/132. Preferably, the opening is not greater than 5% of the area between the upper and lower capacitor electrodes.

The relatively thin capacitor dielectric 140 preferably has sufficient thickness and/or breakdown voltage such that application of a deactivating radio frequency electromagnetic field induces a voltage differential in the capacitor across the dielectric layer that will deactivate the tag/device (e.g., a voltage differential of about 4 to about 50 V, preferably about 5 to less than 30 V, more preferably about 4 to 15 V, or any desired range of endpoints therein) results in breakdown of the dielectric layer to shorted state or changed capacitance such that the tag circuit no longer resonates at the desired frequency. Thus, in certain embodiments, the relatively thin capacitor dielectric layer has (i) a thickness of from 50 to 400 Å and/or (ii) a breakdown voltage of from about 4 to about 15 V.

In general, the dielectric film(s) may comprise any electrically insulative dielectric material, such as a metal or silicon oxide and/or nitride, or other ceramic or glass (e.g., silicon dioxide, silicon nitride, silicon oxynitride, aluminum oxide, tantalum oxide, zirconium oxide, etc.), a polymer such as a polysiloxane, parylene, polyethylene, polypropylene, undoped polyimide, polycarbonate, polyamide, polyether, a copolymer thereof, or a fluorinated derivative thereof, etc. In preferred embodiments, the dielectric film(s) comprises or consists essentially of aluminum oxide, silicon dioxide, and/or a corresponding oxide of the metal used to manufacture the conductive structures, such as the lower capacitor electrode and/or the electrically conducting strap, etc.

In some embodiments, the dielectric film(s) may comprise an inorganic insulator. For example, the dielectric film(s) may include a metal oxide and/or nitride of the formula $M_xO_yN_z$, wherein M is silicon or a metal selected from the group consisting of aluminum, titanium, zirconium, tantalum, hafnium, vanadium, chromium, molybdenum, tungsten, rhodium, rhenium, iron, ruthenium, copper, zinc, indium, tin, lanthanide metals, actinide, metals, and mixtures thereof. In further embodiments, the inorganic insulator may comprise silicates, aluminates, and/or aluminosilicates of such metals and mixtures, where $y/2+z/3$ equals the combined oxidation state of the x instances of M.

In exemplary embodiments, the dielectric film(s) may comprise or be formed from one or more spin on glasses (which may be photodefinable or non-photodefinable, in the latter case patterned by direct printing or post deposition lithography); polyimides (which may be photodefinable and/or thermally sensitized for thermal laser patterning, or non-photodefinable for patterning by direct printing or post deposition lithography); BCB or other organic dielectrics such as SiLK® dielectric material (SILK is a registered trademark of Dow Chemical Co., Midland, Mich.); low-k interlayer dielectrics formed by sol-gel techniques; plasma enhanced (PE) TEOS (i.e., $SiO_2$ formed by plasma-enhanced CVD of tetraethylorthosilicate); and laminated polymer films such as polyethylene, polyester, or higher temperature polymers such as PES, polyimide or others that are compatible with subsequent high temperature processing.

In exemplary embodiments, the dielectric film(s) may comprise an oxide and/or nitride of a Group IVA element, which may further contain conventional boron and/or phosphorous oxide modifiers in conventional amounts. Thus, the Group IVA element may comprise or consist essentially of silicon, in which case the dielectric film(s) may comprise or consist essentially of silicon dioxide, silicon nitride, silicon oxynitride, a borosilicate glass, a phosphosilicate glass, or a borophosphosilicate glass (preferably silicon dioxide).

iv. Exemplary Capacitor Electrodes

Referring still to the device of FIG. 5B, as discussed herein, the lower capacitor electrode 122 is electrically connected to the electrically conducting strap 120. Preferably, the parallel capacitors share the strap 120 as a lower capacitor electrode 122. Thus, the lower capacitor electrode generally comprises the same material(s) and/or characteristics as discussed herein with regard to the electrically conducting strap. Additionally, the device of FIG. 5B comprises an upper capacitor electrode 160 on the first dielectric film 130 and the capacitor dielectric film 140. The upper capacitor electrode 160 is capacitively coupled to the lower capacitor electrode 122 to form the parallel capacitors (e.g., C1 and C2 of FIG. 1). In general, the first capacitor in parallel includes the relatively thin capacitor dielectric layer 140, and the second capacitor includes the relatively thick first dielectric film 130. The second capacitor has much greater area than the first capacitor, and thus has a greater capacitance that the first capacitor. In some embodiments, the upper capacitor electrode 160 may be formed directly above the capacitor dielectric layer 140, such that the upper capacitor electrode 160 completely covers the dielectric layer 140.

In general, the capacitor electrodes (e.g., lower and upper electrodes 122/160) may comprise any suitable conductive material as described herein, such as a metal, an alloy of two or more metals, or a conductive compound (e.g., a refractory metal nitride and/or silicide, where the refractory metal may include Ti, Zn, Ta, Hf, Cr, Mo, W, Re, Rh, Co, Ni, Pd, Pt, etc.). In exemplary embodiments, the capacitor electrode(s) comprise a metal. For example, the upper and/or lower capacitor electrode(s) may comprise aluminum, titanium, copper, silver, chromium, molybdenum, tungsten, nickel, gold, palladium, platinum, zinc, iron, or any alloy thereof (e.g., stainless steel, etc.). In some implementations, the capacitor electrodes may comprise a conductive polymer, such as a doped polythiophene, polyimide, polyacetylene, polycyclo-butadiene and/or polycyclooctatetraene; a conductive inorganic compound film, such as titanium nitride, tantalum nitride, indium tin oxide, etc., and/or a doped semiconductor, such as doped silicon, doped germanium, doped silicon-germanium, doped gallium arsenide, doped (including auto-doped) zinc oxide, zinc sulfide, cadmium sulfide, etc.

In some embodiments, the upper and lower capacitor electrodes 160/122 may comprise the same metal. In such embodiments, the same metal preferably comprises or consists essentially of aluminum, silver, gold, palladium, or nickel. However, the invention is not limited as such, and the upper and lower capacitor electrodes may also comprise different metals. Still, in further embodiments, the upper and/or lower capacitor electrode may comprise the same metal as the electrically conducting strap and/or the antenna/inductor (which also may be selected from the metals described herein).

In exemplary embodiments, the upper and/or lower capacitor electrodes may have a nominal thickness of from 30 nm to 2,000 nm (e.g., of from 50 to 2,000 nm, of from 200 to 1,000 nm, or any other range of values therein) and/or a resistivity of 0.1-10 μohm-cm (preferably from 0.5 to 5 μohm-cm, or any other range of values therein, and in one embodiment, about 3 μohm-cm). While the capacitor electrodes may be located substantially in the center of the device (see, e.g., 122/160 of FIGS. 5A/5B), they also may be located in any area of the device, in accordance with design choices and/or preferences. Also, the capacitor electrodes may have any desired shape, such as round, square, rectangular, triangular, etc., and with nearly any dimensions that allow the electrode(s) to fit in and/or on the surveillance/identification device. In preferred embodiments, at least one capacitor electrode (e.g., the upper capacitor electrode 160) has a dome-shaped profile.

Preferably, the capacitor electrodes have dimensions of (i) width, length and thickness, or (ii) radius and thickness, in which the thickness is substantially less than the other dimension(s). For example, the lower capacitor electrode may have a radius of from 25 to 10,000 µm (preferably 50 to 5,000 µm, 100 to 2,500 µm, or any range of values therein), or a width and/or length of 50 to 20,000 µm, 100 to 10,000 µm, 250 to 5,000 µm, or any range of values therein. Similarly, the upper capacitor electrode may have a radius of from 20 to 10,000 µm (preferably 40 to 5,000 µm, 80 to 2,500 µm, or any range of values therein), or a width and/or length of 40 to 20,000 µm, 80 to 10,000 µm, 150 to 5,000 µm, or any range of values therein.

v. The Antenna and/or Inductor

As shown in FIGS. 5A and 5B, an antenna and/or inductor 170, which may further include contact pads 172/174, is electrically connected to the upper capacitor electrode 160 and the strap 120. Thus, in this embodiment, the antenna/inductor is preferably formed on or over the other structures in the circuit or device (see, e.g., FIG. 5B).

In general, the antenna and/or inductor may comprise any conductive material known in the art. However, in preferred embodiments, the antenna/inductor comprises a metal. The metal may be one that is commercially available (e.g., aluminum, copper, or any other alloy thereof, such as stainless steel, etc.), and may generally comprise any of the metals described herein with regard to conductive structures (e.g., the capacitor electrodes, the strap, a conductive substrate, etc.), and/or methods of forming the same. For example, in exemplary embodiments, the antenna/inductor comprises or consists essentially of aluminum, silver, or an underlying palladium layer and an overlying bulk conductor (e.g., copper, silver, etc.) plated thereon.

In exemplary embodiments, the antenna/inductor may further comprise one or more contact/interconnect pad regions for connecting the inductor/antenna to the capacitor electrodes (e.g., contact pad region 174) and/or the electrically conducting strap (e.g., contact pad region 172). In exemplary embodiments, the contact pads comprise a metal bump or anisotropic conductive paste (ACP). The contact pads of the antenna/inductor may be attached and/or affixed to the capacitor electrodes and/or the electrically conducting strap by an adhesive, which may be either conductive or non-conductive. The antenna/inductor may comprise a continuous structure or it may be discontinuous and comprise a first (outer) inductor coupled to one capacitor electrode and a second (inner) inductor coupled to a second capacitor electrode. In various embodiments, a backing and/or support layer may be attached to the inductor. The support and/or backing layer may provide an adhesive surface for attachment to or placement of the surveillance/identification device to an article to be tracked or monitored.

In exemplary embodiments, the inductor/antenna comprises a coil having a plurality of loops or rings. For clarity and illustrative purposes, the inductor shown in FIGS. 5A and 5B has two loops, rings, or coils. However, any suitable number of loops, rings, or coils may be employed, depending on application requirements and design choices/preferences. Generally, as many as can fit within design rules and manufacturing tolerances are present. The antenna and/or inductor may take any form and/or shape conventionally used for such inductors, but preferably it has a coil or concentric spiral loop form. For ease of manufacturing and/or device area efficiency, the coil loops generally have a square or rectangular shape, but they may also have an octagonal, circular, rounded or oval shape, some other polygonal shape, or any combination thereof, and/or they may have one or more truncated corners, according to application and/or design choices and/or preferences, as long as each successive loop is substantially entirely positioned between the preceding loop and the outermost periphery of the tag/device.

Referring to FIG. 5A, the concentric loops or rings of the antenna/inductor coil 170 may have any suitable width and pitch (i.e., inter-ring spacing), and the width and/or pitch may vary from loop to loop or ring to ring. However, in certain embodiments, the wire in each loop (or in each side of each loop or ring) may independently have a width or thickness of from 2 to 2,000 µm (preferably from 5 to 1000 µm, 10 to 500 µm, 10 to 100 µm or any range of values therein) and a length of 100 to 50,000 µm, 250 to 25,000 µm, 500 to 20,000 µm, or any range of values therein (as long as the lengths of the inductor wire segments do not exceed the dimensions of the surveillance/identification device). Alternatively, the radius of each wire loop or ring in the inductor may be from 250 to 25,000 µm (preferably 500 to 20,000 µm). Similarly, the pitch between wires in adjacent concentric loops or rings of the inductor may be from 2 to 1,000 µm, 3 to 500 µm, 5 to 250 µm, 10 to 200 µm, or any range of values therein. Furthermore, the width-to-pitch ratio may be from a lower limit of about 1:10, 1:5, 1:3, 1:2 or 1:1, up to an upper limit of about 1:2, 1:1, 2:1, 4:1 or 6:1, or any range of endpoints therein. In preferred embodiments, the antenna and/or inductor has a resistivity of from 0.1 to 100 µohm-cm.

Similarly, the contact/interconnect pad(s) 172/174, which are generally configured to provide electrical communication and/or physical contact with the capacitor electrodes and/or contact with the electrically conducting strap, may have any desired shape, such as round, square, rectangular, triangular, etc. Furthermore, the interconnect/contact pad(s) may have nearly any dimensions that allow them to fit in and/or on the surveillance/identification tag or device, and provide electrical communication and/or physical contact with the capacitor electrodes and/or the electrically conducting strap. Preferably, the interconnect pad(s) 172/174 have dimensions of (i) width, length and thickness, or (ii) radius and thickness, in which the thickness is substantially smaller than the other dimension(s). For example, the interconnect pad 172/174 may have a radius or width of from 25 µm up to any radius or width that the tag will permit, considering the number of coils in the antenna and/or the proportion (e.g., percentage) of the integrated circuitry or tag area that is needed for the antenna. Thus, the area dimensions (e.g., width and/or length) may be from 50 to 5,000 µm, 100 to 2,000 µm, 200 to 1,000 µm, or any range of values therein.

vi. The Passivation Layer

Although not shown in FIGS. 5A and 5B, in some embodiments, the device may further comprise a passivation layer on or over the structure. For example, the device may have a passivation layer on or over the upper capacitor electrode and the antenna/inductor (or the other structures formed on the substrate). The passivation layer may inhibit or prevent the ingress of water, oxygen, and/or other species that might cause degradation or failure of the integrated circuitry/device. Furthermore the passivation layer may provide some mechanical support to the device, particularly during subsequent processing steps. The passivation layer is generally conventional, and may comprise an organic polymer, such as parylene, polyethylene, polypropylene, a polyimide, copolymers thereof, a fluorinated organic polymer, or any other barrier material. In other embodiments, the passivation layer may comprise an inorganic dielectric, such as aluminum oxide, silicon dioxide (e.g., which may be conventionally doped and/or which may comprise a spin-on-glass, silicon nitride, silicon oxynitride, polysiloxane, or a combination thereof, as a mixture or a multilayer structure).

In some variations, the passivation layer may further comprise an underlying dielectric layer, which may comprise a material having lower stress than the overlying passivation layer. For example, the dielectric layer may comprise an oxide, such as $SiO_2$ (e.g., TEOS, USG, FSG, BPSG, etc.), and the passivation layer may comprise silicon nitride or a silicon oxynitride. In such embodiments, the passivation layer may have a thickness slightly greater than that of the underlying dielectric layer.

In exemplary embodiments, the passivation layer generally has the same width and length dimensions as the surveillance/identification device. It may also have any thickness suitable for such a surveillance/identification tag or device. For example, the passivation layer may have a thickness of from 0.5 to 100 µm, from 3 to 50 µm, 10 to 25 µm, or any range of values therein.

The present device may also further comprise a support and/or backing layer (not shown in FIG. 5B) on a surface of the inductor. The support and/or backing layers are conventional, and are well known in the surveillance/identification device arts (see, e.g., U.S. Patent Application Publication No. 2002/0163434 and U.S. Pat. Nos. 5,841,350, 5,608,379 and 4,063,229, the relevant portions of each of which are incorporated herein by reference). Generally, such support and/or backing layers provide (1) an adhesive surface for subsequent attachment or placement onto an article to be tracked or monitored, and/or (2) mechanical support for the surveillance/identification device itself. For example, the present tag/device may be affixed to the back of a price or article identification label, and an adhesive coated or placed on the opposite surface of the tag (optionally covered by a conventional release sheet until the tag is ready for use), to form a price or article identification label suitable for use in a conventional surveillance/identification tag/device system. Alternatively, the present device may be placed inside the article or item to be identified and/or tracked (for security purposes), with or without adhering the device to article or item.

A Second Exemplary Surveillance and/or Identification Device with Parallel Capacitors A second exemplary surveillance device 200 with capacitors connected in parallel is shown in FIGS. 9A and 9B (top-down and cross-sectional views, respectively).

i. The Substrate

In the embodiment shown in FIG. 9B, a surveillance and/or identification device 200 comprises an antenna and/or an inductor 270 on a substrate 210. As discussed herein, the substrate in this embodiment may comprise any suitable insulating, conductive, or semiconductive material (e.g., plastic sheet or web, a glass, a wafer, metal foil, etc.). However, substrates comprising an insulating material are preferred. Furthermore, the substrate in the device of FIGS. 9A and 9B may have any of the characteristics described herein with regard to exemplary substrates.

ii. The Antenna and/or Inductor

As shown in FIG. 9B, the antenna and/or inductor 270 of this embodiment is on the substrate 210. In addition, the antenna/inductor may further comprise one or more contact/interconnect pad regions for connecting to the strap (e.g., contact pad 272) and/or the capacitor electrodes (e.g., contact pad 274). In some embodiments, contact pad 274 may also serve as the lower capacitor electrode. In one alternate variation, the antenna/inductor may be formed from a conductive substrate (e.g., by photolithographic patterning and etching, etc.). Surveillance tags and/or devices with an antenna/inductor formed from the conductive substrate, and methods of forming such devices are described in detail in U.S. Pat. Nos. 7,152,804 and 7,286,053, the relevant portions of which are incorporated herein by reference.

In general, the antenna/inductor 270 (and the contact pad regions 272/274) may have any shape, size and/or dimensions suitable for placement on the substrate and/or connection thereto, as described herein. Furthermore, the antenna/inductor 270 in the embodiment of FIG. 9B may comprise any conductive material discussed herein, and preferably, the antenna/inductor comprises a metal. However, in embodiments where the antenna is formed from a conductive substrate, the inductor comprises the same material as the substrate and/or the lower capacitor electrode.

iii. Exemplary Dielectric Films

Exemplary devices with parallel capacitors generally comprise a plurality of dielectric film layers. For example, as shown in FIG. 9B, the device comprises an interlayer dielectric film 232, a first dielectric film 280, and a relatively thin capacitor dielectric film 240.

As shown in FIG. 9B, the interlayer dielectric film 232 is on or over portions of the substrate and/or the antenna/inductor, and generally has one or more contact holes formed therein to facilitate electrical connection from the antenna/inductor to the parallel capacitors. For example, there is a first contact hole in the interlayer dielectric film 232 exposing the antenna pad 274, and a second contact hole in the interlayer dielectric film 232 exposing the antenna pad 272.

The first dielectric film 280 may comprise a relatively thick capacitor dielectric film, and is formed on some or all of the lower capacitor electrode 250, the thin capacitor dielectric film 240, and optionally, on portions of the interlayer dielectric film 232. The first dielectric film 280 has at least one contact hole therein to expose at least a portion of the antenna and/or inductor 270 (e.g., at contact pad 272) and/or an opening over the lower capacitor electrode 250. A relatively thin capacitor dielectric film 240 is on the lower capacitor electrode 250 and in the opening in the first dielectric film 280. The thickness of the thin capacitor dielectric film 240 is significantly less than the thickness of the first dielectric film 280.

Furthermore, in exemplary embodiments, the interlayer dielectric film 232 also has a greater thickness than the thickness of the relatively thin capacitor dielectric film 240.

The dielectric films of the embodiment of FIG. 9B may comprise any of the materials discussed herein with regard to the dielectric films (e.g., a metal oxide, silicon oxide, ceramic, glass, etc.). Furthermore, the dielectric films may have any of the dimensions and/or characteristics described herein. For example, the thin capacitor dielectric film 240 may have a thickness of from 20 to 1,000 Å (e.g., 50 to 400 Å, or any other range of values therein) and/or a breakdown voltage of from about 4 to about 15 V, and the first dielectric film 280 may have a thickness of from 2,000 to 20,000 Å (e.g., 3,000 to 5,000 Å, or any other range of values therein).

iv. Exemplary Capacitor Electrodes

As shown in the device of FIG. 9B, a lower capacitor electrode 250 is on or over the substrate and in electrical contact with the antenna and/or inductor 270 (e.g., at contact pad 274). An upper capacitor electrode 260 is capacitively coupled to the lower capacitor electrode 250 through thin dielectric film 240 and separately through thick dielectric film 280 to form capacitors connected in parallel. As with the first exemplary device shown in FIG. 5B, a first capacitor is under part (preferably, most) of the relatively thin capacitor dielectric film 240, and a second (larger) capacitor is over the relatively thick dielectric film 280. The electrically conducting strap 220 is configured to provide electrical communication between the upper capacitor electrode 260 and the antenna and/or inductor 270 (e.g., at contact pad 272). In the embodiment shown in FIG. 9B, the upper capacitor electrode 260 does not completely cover the capacitor dielectric layer 240, and thus one or more portions of the capacitor dielectric layer 240 may be exposed.

The capacitor electrodes 250/260 may independently comprise any of the conductive materials and/or be formed from ink formulations as described herein (e.g., a metal precursor ink, metal nanoparticles, a metal salt and/or metal complex, a doped or undoped semiconductor, a conductive polymer, etc.). For example, the electrodes may comprise any of the metals described herein (e.g., aluminum, copper, silver, etc.), or an alloy thereof (e.g., stainless steel). In addition, the capacitor electrodes 250/260 may have any of the characteristics, shapes, or other dimensions as described herein.

v. The Electrically Conducting Strap

As shown in FIGS. 9A and 9B, exemplary devices according to the second embodiment comprise an electrically conducting strap 220 on the upper capacitor electrode 250, the dielectric layer(s) (e.g., 240, 280, and 234 of FIG. 9B) and the antenna/inductor 270/272. In general, the electrically conducting strap 220 is configured to provide electrical communication between the upper capacitor electrode 260 and the inductor/antenna 270 (e.g., at connection pad 272). The strap 220 may comprise any electrically conductive material described herein (e.g., preferably a metal), and may have any size and/or shape described herein. In some embodiments, the strap 220 is in direct contact with the upper capacitor electrode (e.g., 260) and/or the antenna/inductor (e.g., pad 272). Alternatively, the strap 220 may be connected to the capacitor electrode 260 and/or the antenna/inductor pad 272 using either a conductive or a non-conductive adhesive. Additionally, the strap 220 may have one or more interconnect/contact pads (e.g., a pad portion) for connecting to a conductive structure (e.g., the capacitor electrode 260 and/or the antenna/inductor 270/272).

A Third Exemplary Surveillance and/or Identification Device with Parallel Capacitors A third exemplary surveillance device with capacitors connected in parallel 300 is shown in FIGS. 10A and 10B. The embodiment of FIGS. 10A and 10B is substantially similar to that of FIGS. 9A and 9B. For example, as shown in FIG. 10A, the device comprises an antenna/inductor 370 on a substrate (preferably comprising an insulating material). The antenna/inductor may also include contact pads 372 and 374. An interlayer dielectric layer 332 is on the antenna/inductor 370, and has contact holes exposing the antenna contact pads 372/374. A lower capacitor electrode 350 is on the interlayer dielectric film 332 and in the contact hole over the contact pad 374. A first dielectric film 380 is on or over the antenna and/or inductor 370 and the lower capacitor electrode 350 and has a contact hole therein exposing a portion of the lower capacitor electrode 350 and the contact pad 372.

In contrast to the device of FIGS. 9A and 9B, the device of FIG. 10A includes a relatively thin capacitor dielectric film 340 on the lower capacitor electrode 350 only in the contact hole in the first dielectric film 380 exposing the lower capacitor electrode 350, and not over the entire lower capacitor electrode as shown in FIG. 9B. However, as previously discussed with the first and second exemplary devices with parallel capacitors, the relatively thin capacitor dielectric film 340 of the device of FIG. 10A also has a thickness that is significantly less than that of the first dielectric film 380 and also the interlayer dielectric film 332. For example, in some exemplary embodiments, the thickness of the first dielectric film (e.g., structure 380) may have a thickness of at least 5 times that of the relatively thin capacitor dielectric film (e.g., structure 340). An upper capacitor electrode 360 is formed on the device and is capacitively coupled to the lower capacitor electrode 350 to form the capacitors connected in parallel. An electrically conducting strap 320 connects the upper capacitor electrode 360 and the antenna/inductor at contact pad 372.

In general, the conductive structures of the device in FIG. 10A (e.g., the antenna/inductor 370/372/374, upper and lower capacitor electrodes 350/360, and the electrically conducting strap 320) may comprise any of the conductive materials described herein. Similarly, the dielectric films (e.g., interlayer dielectric film 332, the relatively thick dielectric film 380, and the relatively thin dielectric film 340) may comprise any of the insulating materials described herein. Furthermore, the various structures of the device of FIG. 10A (e.g., the substrate, the dielectric films, the capacitor electrodes, the strap, and/or the antenna) may have any of the sizes, shapes, and/or characteristics as those described herein with regard to that structure. In some embodiments, the device of FIG. 10A may also comprise a passivation layer over the electrically conducting strap and the upper capacitor electrode, as described herein.

As shown in FIG. 10B, in some variations, a backing and/or support layer 390 may be desired (or required) to provide mechanical stability and/or protection for the device during later handling and/or processing. Such a backing layer may be laminated to paper or a flexible polymeric material (e.g., polyethylene, polypropylene, polyvinyl chloride, polytetrafluoroethylene, a polycarbonate, an electrically insulating polyimide, polystyrene, copolymers thereof, etc.). In addition to providing mechanical support to the device, such a support and/or backing layer may also provide an adhesive surface for subsequent attachment or placement of the surveillance/identification device onto an article to be tracked or monitored.

An Exemplary Surveillance and/or Identification Device with Series Capacitors

An exemplary surveillance and/or identification device 500 with a plurality of capacitors connected in series is shown in FIGS. 11 and 12 (cross-sectional and top-down views, respectively).

i. The Substrate

As shown in FIG. 11, the surveillance and/or identification device with series capacitors comprises a substrate 510 and a first dielectric film 540 thereon. In exemplary embodiments, the substrate comprises an electrically conductive (e.g., electrically functional) material as described herein. In exemplary embodiments, the conductive substrate comprises or consists essentially of aluminum. In some implementations, the metal for the electrically conductive substrate may be chosen at least in part based on its ability to be anodized into an effective dielectric film. In preferred embodiments, the capacitors share the electrically conducting substrate (e.g., metal sheet, metal foil, etc.) 510 as a common lower capacitor electrode (see, e.g., the node "foil" in FIG. 2).

However, the device is not limited to an electrically conductive substrate. On the contrary, in some variations, the device may comprise an insulative substrate (e.g., glass, ceramic, plastic, etc.) as previously described herein. In embodiments comprising an insulative substrate, there is a conductive layer (e.g., the lower capacitor electrodes) on the insulative substrate (not shown in FIG. 11), and in exemplary embodiments, the capacitors may share the conductive layer as a common lower capacitor electrode. Furthermore, in some embodiments, the device may further include a conductive or non-conductive adhesive on the (electrically conductive) substrate for attaching the device/tag to an item (not shown).

In exemplary embodiments, the conductive substrate may have a nominal thickness of from 1 to 300 μm (e.g., 3 to 200 μm, 5 to 100 μm, or any other range of values therein). Preferably the substrate has a thickness of from 1 to 100 μm, or any other range of values therein. Furthermore, the conductive substrate may have a resistivity of 0.1 to 100 μohm-cm (preferably 0.5 to 5 μohm-cm), or any other range of values therein.

ii. Exemplary Capacitor Electrodes

As shown in FIG. 11, a plurality of capacitor electrodes 530/535 are on the first dielectric film 540, and the capacitor electrodes are capacitively coupled to the substrate 510.

Consequently, the electrically conductive substrate 510, the first dielectric film 540, and the plurality of capacitor electrodes 535/530 form capacitors C1 and C2 connected in series (see also FIG. 2).

In exemplary embodiments, the upper capacitor electrodes comprise a contact pad (e.g., P1 and P2 of FIGS. 11 and 12) for electrically connecting the capacitors with the antenna and/or inductor (e.g., structures 570 and 575 of FIGS. 11 and 12). Alternatively, the upper capacitor electrodes may be electrically connected to contact pads. In addition, the upper capacitor electrodes 530 and 535 may be formed side by side, but are generally physically isolated from one another. For example, the capacitor electrodes may be physically isolated or separated by a relatively thick dielectric film 580 on the first dielectric film 540 having openings into/onto which the electrodes 530/535 are formed.

The capacitor electrodes may comprise any conductive material (e.g., a metal, a conductive polymer, a conductive inorganic compound, a doped semiconductor, etc.) described herein with regard to conductive structures and/or methods of forming conductive structures. In some embodiments, the upper and lower capacitor electrodes may comprise the same material, or alternatively, they may comprise different materials. For example, in some embodiments, the conductive substrate (or conductive layer) comprises a first metal and the upper capacitor electrodes comprise a second metal.

As previously discussed, in preferred embodiments, the capacitors in series share the conductive substrate (or conductive layer on an insulating substrate) as lower capacitor electrodes. Consequently, the lower capacitor electrodes have the same characteristics as described with regard to exemplary substrates. The upper capacitor electrodes may have any desired shape (e.g., round, square, rectangular, triangular, dome-shaped, etc.), characteristics, size, and nearly any dimensions that allow it to fit in and/or on the surveillance/identification device as discussed herein.

iii. Exemplary Dielectric Film Layers

Referring again to FIG. 11, embodiments of the present invention include a plurality of dielectric film layers (e.g., capacitor dielectric film 540, thick dielectric layer 580, and/or the upper capacitor dielectric layer 560). The capacitor dielectric film 540 is formed on some or all of the conductive substrate 510, and separates the conductive substrate (e.g., lower capacitor electrodes) from the upper capacitor electrodes 530/535. In general, the capacitor dielectric film 540 may have a thickness of from 50 to 400 Å, or any range of values therein. A relatively thick dielectric film 580 may be formed on portions the capacitor dielectric film 540, and generally has one or more contact holes/capacitor electrode openings therein. In preferred embodiments, the thick dielectric film 580 has a sufficient thickness to keep capacitance between the portions of the upper capacitor electrodes 530/535 (e.g., at contact pads P1 and P2) on the thick dielectric film 580 and the substrate 510 to a value significantly less than the capacitances of the plurality of capacitors (e.g., C1 and C2) on the first dielectric layer 540.

As shown in FIG. 11, the device also comprises a dielectric layer (e.g., interlayer dielectric layer 560) on or over the upper capacitor electrodes 530/535. The dielectric layer 560 has contact holes or connection openings therein exposing a portion of the top electrodes, for example at contact pads P1 and P2. Such a structure permits assembly of the device onto an antenna and/or inductor 570 with electrical contacts 575 at contact pads P1 and P2, without requiring a direct electrical connection to the electrically conductive substrate 510. In some embodiments, the dielectric layer on the upper electrodes (e.g., ILD 560) has a greater thickness than the capacitor dielectric film 540 on the substrate 510.

In general, the dielectric films may comprise any electrically insulative dielectric material (e.g., an inorganic insulator, a liquid-phase dielectric precursor ink, etc.) as discussed herein, and may have the same or similar characteristics as discussed herein.

iv. The Antenna and/or Inductor

Exemplary devices with series capacitors comprise an antenna and/or inductor (e.g., 570/575) electrically contacting the upper capacitor electrodes (e.g., at contact pads P1 and P2), as shown in FIGS. 11 and 12. The antenna and/or inductor of devices with series capacitors may have the same or similar characteristics as those described in detail herein. However, in contrast to devices with parallel capacitors, the device with series capacitors generally does not include an electrically conducting strap. Therefore, the antenna/inductor shown in the device of FIGS. 11 and 12 electrically connects the upper capacitor plates, and does not connect the upper capacitor electrodes to an electrically conducting strap.

In general, the antenna/inductor may comprise any conductive material as described herein, and preferably the antenna/inductor comprises a metal (e.g., aluminum, copper, alloys thereof, etc.). In some embodiments, the antenna may comprise one or more contact pad regions for connecting the antenna to the upper capacitor electrodes. The antenna/inductor may be attached to the capacitor electrodes by a conductive or non-conductive adhesive, and may further comprise a backing and/or support layer for attachment to or placement of the device/tag to an article or product. However, the backing and/or support layer may alternately be on a passivation layer as described herein, or on the substrate (see, e.g., layer 104b in FIG. 3C).

The antenna/inductor may comprise a coil having a plurality of loops or rings as described herein, and may take any form and/or shape suitable for such antennas and/or inductors. For example, the antenna (and optionally the contact/interconnection pads) of the present device may have any of the shapes, dimensions, or designs described herein. Furthermore, the present device may also comprise a passivation layer or other additional backing or support layer the same or similar to those described herein.

Exemplary Methods of Detecting Items Using the Present Surveillance and/or Identification Tags/Devices The present invention further relates to method of detecting an item or object in a detection zone comprising the steps of: (a) causing or inducing a current in the device(s) of the present invention sufficient for the device to radiate, reflect, backscatter, or absorb detectable electromagnetic radiation (preferably at a frequency that is an integer multiple or an integer divisor of an applied electromagnetic field), (b) detecting the detectable electromagnetic radiation, and optionally, (c) selectively deactivating the device and/or causing the device to take action. Generally, currents and voltages are induced in the present device sufficient for the device to radiate, reflect, backscatter, or absorb detectable electromagnetic radiation when the device is in a detection zone comprising an oscillating electromagnetic field. This oscillating electromagnetic field is produced or generated by conventional surveillance/identification detection equipment and/or systems.

The present method of use may further comprise attaching, affixing or otherwise including the present device on or in an object or article to be detected. Furthermore, in accordance with an advantage of the present device, the tag or device may be deactivated by non-volatile shifting of the thresholds (i.e., position of the CV curve features versus voltage) or capacitance of the device in response to an applied electromagnetic field having sufficient strength and an effective oscillating frequency to induce a current, voltage and/or resonance in the device. Typically, the device is deactivated when the presence of the object or article in the detection zone is not to be detected or otherwise known.

Use of electronic and/or wireless identification and security systems for detecting and/or preventing theft or unauthorized removal of articles or goods from retail establishments and/or other facilities (e.g., libraries, etc.) has become widespread. In general, surveillance/identification device systems employ a label or security tag/device (e.g., an EAS, RF, RFID, etc.), which is affixed to, placed inside, associated with, or otherwise secured to an article or item to be detected (e.g., protected) or the packaging of the item. Surveillance/identification tags may have many different sizes, shapes and forms, depending on the particular type of system in use, the type and size of the article, etc. In general, such systems are employed for detecting the presence or absence of an active security tag as the security tag and the protected article to which it is affixed (or placed inside) pass through a security or surveillance zone or pass by or near a security checkpoint or surveillance station. However, the present invention is not limited to security. For example, the present surveillance/identification devices may further comprise logic, which causes the device to perform an action upon detection in the detection zone.

The present tags are designed at least in part to work with electronic security systems that sense disturbances in radio frequency (RF) electromagnetic fields. Such electronic security systems generally establish an electromagnetic field in a controlled area defined by portals through which articles must pass in leaving the controlled premises (e.g., a retail store). A tag/device having a resonant circuit is attached to each article, and the presence of the tag circuit in the controlled area is sensed by a receiving system to denote the unauthorized removal of an article. The tag circuit may be deactivated, detuned or removed by authorized personnel from any article authorized to leave the premises to permit passage of the article through the controlled area equipped with alarm activation. Most of the tags that operate on this principle are single-use or disposable tags, and are therefore designed to be produced at low cost in very large volumes.

The present tags may be used (and, if desired and/or applicable, re-used) in any commercial application and in essentially any frequency range for such applications. For example, the present tags may be used at the frequencies, and in the fields and/or ranges, described in the Table below:

TABLE 1

Exemplary Applications.

| Frequencies | Preferred Frequencies | Range/Field of Detection/ Response | Preferred Range/Field of Detection/ Response | Exemplary Commercial Application(s) |
|---|---|---|---|---|
| 100-150 KHz | 125-134 KHz | up to 10 feet | up to 5 feet | animal ID, car anti-theft systems, beer keg tracking |
| about 8.2 MHz | 8.2 MHz | up to 10 feet | up to 5 feet | anti-theft, inventory tracking (e.g., libraries, apparel, auto/motorcycle parts), building security/access |
| about 13.56 MHz | 13.56 MHz | up to 10 feet | up to 5 feet | inventory tracking (e.g., libraries, apparel, auto/motorcycle parts), building security/access |
| 800-1000 MHz | 868-928 MHz | up to 30 feet | up to 18 feet | pallet and shipping container tracking, shipyard container tracking |
| 2.4-2.5 GHz | about 2.45 GHz | up to 30 feet | up to 20 feet | auto toll tags |

Deactivation methods generally incorporate remote electronic deactivation of a resonant tag circuit such that the deactivated tag can remain on an article properly leaving the premises. Examples of such deactivation systems are described in U.S. Pat. Nos. 4,728,938 and 5,081,445, the relevant portions of each of which are incorporated herein by reference. Electronic deactivation of a resonant security/identification tag involves changing or destroying the detection frequency resonance so that the security tag is no longer detected as an active security tag by the security system. There are many methods available for achieving electronic deactivation. In general, however, the known methods involve either short circuiting a portion of the resonant circuit or creating an open circuit within some portion of the resonant circuit to either spoil the Q of the circuit or shift the resonant frequency out of the frequency range of the detection system, or both.

At energy levels that are typically higher than the detecting signal, but generally within FCC regulations, the deactivation apparatus induces a voltage in the resonant circuit of the tag or device sufficient to cause the dielectric film between the lower capacitor electrode and the upper capacitor electrode to break down. Thus, the present surveillance/identification device(s) described herein can be conveniently deactivated at a checkout counter or other similar location by momentarily placing the tag above or near the deactivation apparatus.

The present invention thus also pertains to article surveillance techniques wherein electromagnetic waves are transmitted into an area of the premises being protected at a fundamental frequency (e.g., 13.56 MHz), and the unauthorized presence of articles in the area is sensed by reception and detection of electromagnetic radiation emitted or absorbed by the present surveillance/identification device(s). This emitted or absorbed electromagnetic radiation may comprise second harmonic or subsequent harmonic frequency waves reradiated from sensor-emitter elements, labels, or films comprising the present wireless surveillance device that has been attached to or embedded in the articles, under circumstances in which the labels or films have not been deactivated for authorized removal from the premises.

A method of article surveillance, theft detection, or other methods of identification according to aspects of the present invention may be understood with the following description of the sequential steps utilized. The present surveillance/identification tag (for example, formed integrally with a price label) is attached to or embedded in an item, article or object that may be under system surveillance. Next, any active tags/devices on articles that have been paid for or otherwise authorized for removal from the surveillance area may be deactivated or desensitized by a deactivation apparatus operator (e.g., a checkout clerk or guard) monitoring the premises. Thereafter, harmonic frequency emissions or re-radiation signals or electromagnetic waves or energy from devices/tags that have not been deactivated or desensitized are detected as they are moved through a detection zone (e.g., an exit or verification area) in which a fundamental frequency electromagnetic wave or electrical space energy field is present. The detection of harmonic signals in this area signifies the unauthorized presence or attempted removal of unverified articles with active devices/tags thereon, and may be used to signal or trigger an alarm or to lock exit doors or turnstiles. While the detection of tag signals at a frequency of 2 times or ½ the carrier or reader transmit frequency represents a preferred form of the method of use, other harmonic signals, such as third and subsequent harmonic signals, as well as fundamental and other subharmonic signals, may be employed.

Conclusion/Summary

Thus, the present invention provides surveillance and/or identification tags/devices having capacitors connected in parallel or in series, and methods of making and using such devices. Aspects of the present invention relate to surveillance and/or identification devices with parallel capacitors. Devices having capacitors connected in parallel result in both a high-precision capacitance and a low breakdown voltage for easy tag deactivation. In such embodiments, a single capacitor generally used in surveillance and/or identification devices is replaced with a plurality of capacitors, which are connected in parallel. In general, one of the capacitors is fabricated with a thicker dielectric than the other(s), which results in a large-area capacitor. The large geometric features of the large-area capacitor allow the capacitor to be manufactured to a high precision of capacitance within the tolerances of the printing or patterning processes used to define the capacitor. A second, smaller capacitor is fabricated with a much thinner dielectric film. This allows the smaller capacitor to break down at the low voltage required for surveillance tag deactivation. In addition, the capacitance of the smaller capacitor is smaller than that of the large-area capacitor, so that it can be fabricated with a relatively poor precision compared to that of the large-area capacitor, and still have a relatively minor effect on the overall precision of the net capacitance of the device.

Additional aspects of the present invention relate to tags/devices with series capacitors. By manufacturing a device with capacitors connected in series, lateral dimensions of a small capacitor can be increased. This makes the capacitor easier to manufacture using techniques, such as printing processes, that may have relatively limited resolution capabilities. In such embodiments, a single capacitor is replaced with a plurality of capacitors connected in series (e.g., C1 and C2 of FIG. 2), preferably sharing a common electrode. The capacitances of the device add in series to an effective net capacitance of CT as shown in the formula $1/CT=1/C1+1/C2$. If the capacitance of C1 and C2 are equal, both C1 and C2 are twice the capacitance of the net capacitance CT, and thus have an area twice as large as that of a single capacitor with capacitance CT. This may result in an increased dimensional tolerance allowed for any printing or patterning steps that are used to define the capacitor area.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for making a surveillance and/or identification device, comprising:
   a) forming an electrically conducting strap and a lower capacitor electrode on a substrate;
   b) forming a first dielectric film on the substrate and on a portion of the strap, the first dielectric film exposing a portion of the strap and having an opening over a portion of the lower capacitor electrode;
   c) forming a capacitor dielectric film in the opening, the capacitor dielectric film having a significantly smaller thickness than the first dielectric film;
   d) forming an upper capacitor electrode on the first dielectric film and the capacitor dielectric film, such that the upper capacitor electrode (i) is capacitively coupled to the lower capacitor electrode and (ii) forms a first capacitor and a second capacitor connected in parallel, wherein the first capacitor includes the relatively thin capacitor dielectric film and the second capacitor includes the relatively thick dielectric film and the second capacitor has a greater capacitance than the first capacitor; and
   e) forming an antenna and/or inductor on the upper capacitor electrode and the strap, or attaching an antenna and/or inductor to the upper capacitor electrode and the strap.

2. The method of claim 1, wherein forming the strap comprises printing a conductor ink on the substrate.

3. The method of claim 1, wherein forming the first dielectric film comprises selectively depositing a first dielectric material on the strap and the lower electrode such that predetermined regions of the strap and the lower electrode are exposed.

4. The method of claim 3, wherein forming the first dielectric film comprises printing a dielectric precursor ink.

5. The method of claim 1, wherein forming the upper capacitor electrode comprises printing a metal ink on the capacitor dielectric film and the first dielectric film.

6. The method of claim 1, wherein forming the antenna and/or inductor comprises printing a continuous metal or conductor ink pattern on the upper capacitor electrode and the strap.

7. The method of claim 1, wherein forming the first dielectric film comprises the steps of (i) depositing a liquid-phase dielectric precursor ink, and (ii) drying and/or curing the dielectric precursor to form the dielectric.

8. The method of claim 1, wherein the second capacitor has a greater area than that of the first capacitor.

9. The method of claim 1, wherein forming the electrically conducting strap and the lower capacitor electrode comprises printing a conductive seed layer, and electroplating or electrolessly plating a bulk conductor thereon.

10. The method of claim 1, wherein (i) the strap and the lower capacitor electrode are formed in a single processing step, and (ii) the lower capacitor electrode is shared by the first and second capacitors.

11. The method of claim 1, wherein forming the upper capacitor electrode and/or the lower capacitor electrode comprises printing a metal precursor ink, and drying and curing the metal precursor ink.

12. The method of claim 11, wherein printing comprises inkjet printing, microspotting, screen printing, gravure printing, offset printing, flexography, laser forward transfer, and/or local laser chemical vapor deposition.

13. The method of claim 11, wherein the metal precursor ink comprises titanium, tungsten, nickel, palladium, platinum, aluminum, gold, chromium, molybdenum, or a combination thereof.

14. The method of claim 11, wherein the metal precursor ink comprises one or more metal precursors selected from the group consisting of metal nanoparticles, organometallic compounds, and metal salts, in a solvent in which the metal precursor(s) are soluble.

15. The method of claim 1, wherein forming the upper capacitor electrode and/or the lower capacitor electrode comprises printing an ink comprising a metal nitride and/or a metal silicide.

16. The method of claim 15, wherein the ink comprises titanium nitride, titanium silicide, tantalum nitride, cobalt silicide, molybdenum silicide, tungsten silicide, platinum silicide, and/or palladium silicide.

17. The method of claim 1, wherein the opening in the first dielectric film has an area not greater than 20% of the area between the upper and lower capacitor electrodes containing the first dielectric film.

18. The method of claim 1 wherein the relatively thin capacitor dielectric film comprises a corresponding oxide of a metal forming the lower capacitor electrode and/or the strap.

19. The method of claim 1, wherein forming the relatively thin capacitor dielectric film comprises thermally and/or chemically oxidizing an exposed surface of the lower capacitor electrode.

20. The method of claim 1, wherein forming the upper capacitor electrode and/or the lower capacitor electrode comprises depositing an element precursor ink comprising one or more Group IVA elements, a Group III, a Group IV, or a Group V material, and/or an organic or polymeric semiconductor at a thickness of from 50 to 200 nm to form a semiconductor layer and/or component.

21. The method of claim 20, wherein the element precursor ink comprises a dopant.

22. The method of claim 1, wherein forming the upper capacitor electrode and/or the lower capacitor electrode comprises priming a semiconductor layer.

23. The method of claim 22, further comprising doping the semiconductor layer.

24. The method of claim 23, wherein doping the semiconductor layer comprises implanting a dopant or diffusing the dopant into the semiconductor layer from a solid or a vapor dopant source.

* * * * *